(12) United States Patent
Song et al.

(10) Patent No.: US 11,632,275 B2
(45) Date of Patent: Apr. 18, 2023

(54) CMOS SIGNALING FRONT END FOR EXTRA SHORT REACH LINKS

(71) Applicant: NVIDIA Corp., Santa Clara, CA (US)

(72) Inventors: Sanquan Song, Mountain View, CA (US); John Poulton, Chapel Hill, NC (US)

(73) Assignee: NVIDIA CORP., Santa Clara, CA (US)

( * ) Notice: Subject to any disclaimer, the term of this patent is extended or adjusted under 35 U.S.C. 154(b) by 65 days.

(21) Appl. No.: 17/243,035

(22) Filed: Apr. 28, 2021

(65) Prior Publication Data

US 2022/0353115 A1    Nov. 3, 2022

(51) Int. Cl.
*H04L 25/34* (2006.01)
*H04L 25/49* (2006.01)
*H04B 1/00* (2006.01)

(52) U.S. Cl.
CPC ....... *H04L 25/4917* (2013.01); *H04B 1/0082* (2013.01)

(58) Field of Classification Search
CPC .......................... H04L 25/4917; H04B 1/0082
USPC ....................................................... 375/288
See application file for complete search history.

(56) References Cited

U.S. PATENT DOCUMENTS

| | | | |
|---|---|---|---|
| 6,897,736 B2 | 5/2005 | Zeijl et al. | |
| 7,132,903 B1 | 11/2006 | Johnson et al. | |
| 7,183,864 B1 | 2/2007 | Gutnik | |
| 7,598,811 B2 * | 10/2009 | Cao | H03G 1/0088 330/254 |
| 7,796,953 B2 | 9/2010 | Alanen et al. | |
| 7,902,924 B2 | 3/2011 | Cao | |
| 9,674,015 B2 | 6/2017 | Kireev et al. | |
| 9,832,048 B2 * | 11/2017 | Kireev | H03K 19/018528 |
| 10,476,516 B1 | 11/2019 | Chuai et al. | |
| 11,398,934 B1 * | 7/2022 | Casey | H04L 27/04 |
| 2005/0089126 A1 * | 4/2005 | Zerbe | H04L 5/1438 375/353 |
| 2017/0187399 A1 | 6/2017 | Hunter et al. | |

OTHER PUBLICATIONS

Emanuele Depaoli et al (A 64 Gb/s Low-power Transceiver for short-Reach PAM-4 Electrical Lines in 28-nm FDSOI CMOS, IEEE Journal of solid-state circuits, vol. 54, No. 1, Jan. 2019, p. 6-17.*

* cited by examiner

*Primary Examiner* — Helene E Tayong
(74) *Attorney, Agent, or Firm* — Rowan TELS LLC

(57) ABSTRACT

A transceiver circuit includes a receiver front end utilizing a ring oscillator, and a transmitter front end utilizing a pass-gate circuit in a first feedback path across a last-stage driver circuit. The transceiver circuit provides low impedance at low frequency and high impedance at high frequency, and desirable peaking behavior.

28 Claims, 14 Drawing Sheets

LEGEND

TRANSCEIVER 802
COMPUTING SYSTEM 804
VEHICLE 806
ROBOT 808

LEGEND: DIFFERENTIAL PAM-2 TRANSCEIVER 100

DRIVER CIRCUIT 102
DIFFERENTIAL DATA LINE 104
RECEIVER DECODING LOGIC 106

LEGEND: PAM-4 TRANSCEIVER 300

PAM-2 TRANSCEIVER 200
DATA LINE 202
DRIVER CIRCUIT 302
TUNABLE PASS-GATE CIRCUIT 304
LSB STAGE 306

MSB STAGE 308
DATA LINE NODE 310
SLICER CIRCUITS 312

LEGEND: TRANSMITTER FRONTEND CIRCUIT 400
PASS-GATE CIRCUIT 402          DRIVER CIRCUIT 406
LAST-STAGE DRIVER CIRCUIT 404  DRIVER CIRCUIT 408

LEGEND: RECEIVER FRONTEND CIRCUIT 500
DRIVER CIRCUIT 502    DRIVER CIRCUIT 508
DRIVER CIRCUIT 504    PASS-GATE CIRCUIT 510
DRIVER CIRCUIT 506

CMOS SIGNALING FRONT END FOR EXTRA SHORT REACH LINKS

BACKGROUND

Many circuit dies, such as graphics processing units (GPUs), memory dies, and electrical-optical dies are integrated closely through an interposer, interposer bridge, or organic package for energy efficient communication, which may be especially important with recent generation artificial intelligence (AI) algorithms. A robust, low-power, high-throughput front end is needed to support the greatly increased number of extra short reach (XSR) links (~1 mm long) utilized in these tightly-integrated dies.

Conventional differential low-swing two-level pulse amplitude modulation (PAM-2) or four-level pulse amplitude modulation (PAM-4) front end require classical impedance matching at both transmitter and receiver ends. Such a circuit is depicted for example by the differential PAM-2 transceiver 100 in FIG. 1. Such circuits are overly complex and poor performers in term of area efficiency, energy efficiency, and throughput per edge millimeter for XSR links. For example, such circuits typically utilize a careful balance between the transmitter driver impedance and a serial resistor so that the total impedance matches the channel reasonably well across voltage and temperature variations. This leads to larger than necessary driver sizing, excessive power consumption, and an additional calibration step before the circuit enters normal operation. To match the impedance, the signal swing on the channel is typically bounded to half of VDD, leading to vulnerability to noise. Differential signaling helps reject the noise at the cost of halving throughput per edge millimeter. Given the low-loss nature of these XSR channels, a simple low-power CMOS type frontend with built-in impedance matching and peaking is highly desired.

BRIEF SUMMARY

A CMOS signaling front end for extra short reach (XSR) links comprises a transmitter that includes an inverter-based driver with a feedback pass-gate and a receiver that includes a ring oscillator (RO) based circuit for bandwidth boosting with corresponding samplers. The front end mixes impedance matching and peaking with CMOS circuit components.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
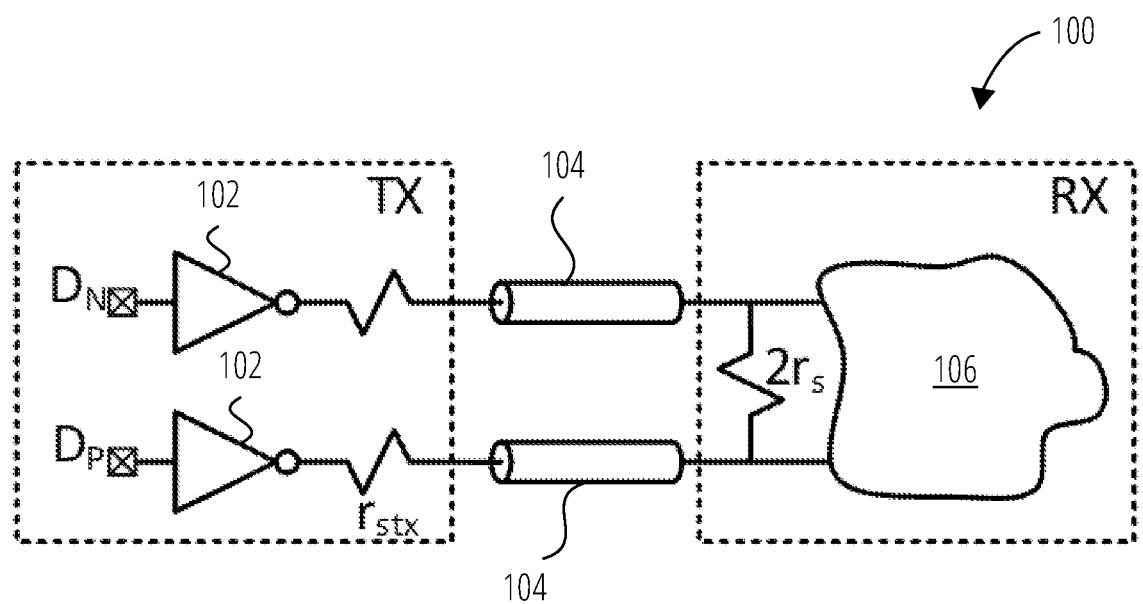
FIG. 1 depicts a conventional differential PAM-2 transceiver 100.

Embodiments of a transceiver circuit disclosed herein include a receiver front end utilizing a ring oscillator-based circuit, and a transmitter front end utilizing a pass-gate circuit in a first feedback path across a last-stage driver circuit. "Last-stage driver circuit" refers to the driver circuit that outputs to the data line (not to another driver circuit) in a transmitter front end. The pass-gate circuits, driver circuits, ring oscillator etc. may all be complementary metal-oxide-semiconductor (CMOS) components.

In some embodiments the output current of the pass-gate circuit is tunable to provide bandwidth response tuning. Likewise an output current of a feedback driver circuit of the ring oscillator may be tunable. Generally, the pass-gate circuit provides a tunable resistance and thus tunable output current. Other tunable CMOS resistive components, many of which are known in the art (i.e., so-called voltage-controlled CMOS "active resistors"), may also be used in some embodiments. However, pass-gate circuits may have particularly advantageous properties (e.g., power consumption, area, transconductance properties, etc.) that make them particularly well suited in some implementations.

The transceiver circuit may be a PAM-2 transceiver, a PAM-4 transceiver, or generally a PAM-N transceiver. In an exemplary PAM-4 embodiment, which may be readily extended to PAM-N, the transmitter front end includes two stages arranged in parallel to form a PAM-4 symbol for a most significant bit of a data value, and one stage to form a least significant bit of the PAM-4 symbol. Each of the stages includes a pass-gate circuit and a last-stage driver circuit arranged in parallel.

Embodiments are also described wherein the transmitter front end further includes a feed-forward circuit in parallel with the first feedback path, and/or in which the ring oscillator further includes a feed-forward circuit. In other described embodiments the transmitter front end further includes at least one driver circuit in a second feedback path across the last-stage driver circuit, where the first feedback path is across only the last-stage driver circuit, and the second feedback path is across a plurality of other driver circuits. In other embodiments the ring oscillator includes a pass-gate circuit in a second feedback path across a first-stage driver circuit and a second feedback path across one or more later-stage driver circuits. "First-stage driver circuit" refers to a driver circuit in a receiver front end that receives input directly from the data line (not from other driver circuits). "Later-stage driver circuits" refers to driver circuits in a receiver front end that receive outputs from the first-stage driver circuit.

The pass-gate circuit across the last-stage driver circuit in the transmitter provides low impedance at low frequency and high impedance at high frequency. When the last-stage driver circuit is implemented as an inverter, this effect is especially pronounced near the inverter switching voltage. Another result is transmitter peaking with the impedance matching.

The ring oscillator of the receiver front end provides low impedance at low frequency and high impedance at high frequency. When the driver circuits of the ring oscillator are implemented as inverters, this effect is especially pronounced near the inverter switching voltage. Another effect is the generation of negative impedance due to loop latency of the ring oscillator.

Other technical features may be readily apparent to one skilled in the art from the following figures, descriptions, and claims.

FIG. 1 depicts a conventional differential PAM-2 transceiver 100. Driver circuits 102 of the transmitter (TX) communicate two-level PAM symbols over two differential data lines 104 to a receiver (RX), where the symbols are processed by receiver decoding logic 106. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). In general, there may be more than two differential data lines 104 each with a corresponding driver circuit 102.

Figure 2:
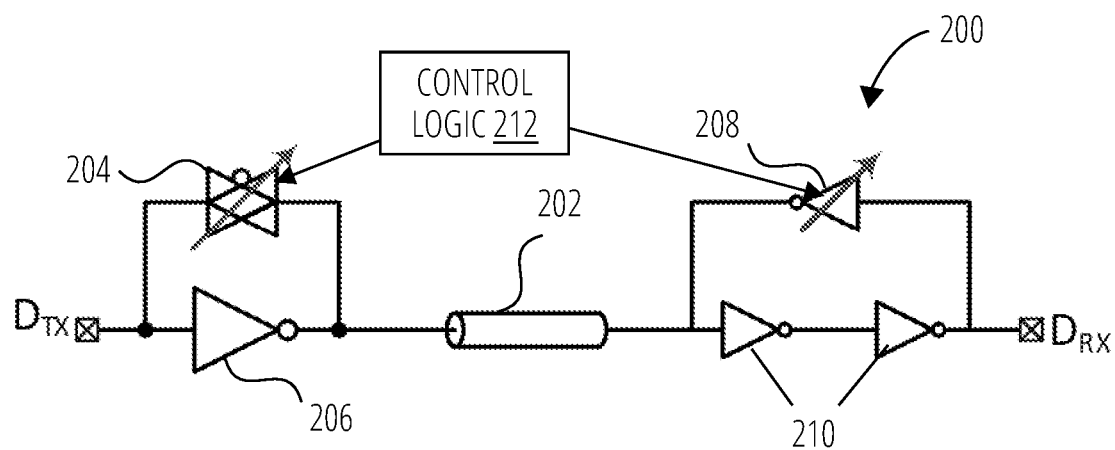
FIG. 2 depicts a PAM-2 transceiver 200 in accordance with one embodiment.

A PAM-2 transceiver 200 is depicted in FIG. 2 in one embodiment. The PAM-2 transceiver 200 comprises a transmitter front end and a receiver front end coupled over a data line 202. The transmitter front end comprises a pass-gate circuit 204 in a feedback path across a last-stage driver circuit 206. The pass-gate circuit 204 may in some embodiments be tunable, meaning the level of its resistance may be adjusted after manufacture. The receiver front comprises a ring oscillator formed from a feedback driver circuit 208 coupled in a feedback path across one or more driver circuits 210. The feedback driver circuit 208 may also be tunable in some embodiment. Some embodiments may also comprise control logic 212 to dynamically (over the operating lifetime of the PAM-2 transceiver 200) tune one or both of the pass-gate circuit 204 and the feedback driver circuit 208 using an adjustable applied voltage, current, or digital code.

The last-stage driver circuit 206, feedback driver circuit 208, and driver circuits 210 may in some embodiments be implemented as inverter circuits, although other driver circuits may also be utilized in some cases.

The PAM-2 transceiver 200 is single-ended while conventional PAM-2 transceivers are typically differential. A single-ended design may provide greater throughput per edge millimeter while consuming less power than differential designs. The PAM-2 transceiver 200 provides impedance matching with peaking while the conventional transceivers are typically designed to flatten the impedance across the operating frequency range of the transceiver. The transmitter front end impedance is determined by the transconductance $g_m$ of the last-stage driver circuit 206 and the resistance $r_{pass-gate}$ of the pass-gate circuit 204 in the transmitter feedback path. The receiver front end impedance is determined by the impedance of the feedback driver circuit 208 in the receiver feedback path, which is small at low frequency and large at high frequency, with maximum peaking at the ring oscillator's natural frequency. The last-stage driver circuit 206 is designed to be much larger (designed to handle more power/current) than the feedback driver circuit 208 so that the ring oscillator behaves as an injection locked oscillator, processing the signal determined by the transmitter front end instead of resonating at its own natural frequency.

The pass-gate circuit 204, last-stage driver circuit 206, feedback driver circuit 208, and driver circuit 210 may all be implemented with CMOS blocks, such as CMOS inverters and pass-gates. No bias or traditional analog amplifier need be utilized. The input $D_{TX}$ and output $D_{RX}$ may thus both be CMOS signals.

During operation, the input and output signal levels of the last-stage driver circuit 206 (for example when implemented as an inverter) will each typically be around half the supply voltage VDD (i.e., an inverter operating in its saturation region). Therefore at low frequencies of operation, the output and input of the last-stage driver circuit 206 follow the same voltage because of the feedback through the pass-gate circuit 204. The output impedance of the transmitter front end may thus be characterized as $1/g_m$ of the last-stage driver circuit 206. If the last-stage driver circuit 206 is implemented as an inverter, $g_m$ is the sum of the transconductance of the PMOS and NMOS devices inside the inverter. At high frequencies of operation, the input of the last-stage driver circuit 206 may be treated as grounded because of parasitic capacitance. In this situation, the output impedance of the transmitter front end may be characterized as $r_{pass-gate}$, the resistance of the pass-gate circuit 204.

Several benefits may arise from these characteristics. Die area and power savings may be achieved with smaller components in the transmitter front end due to the output impedance being $1/g_m$ at low operating frequencies of operation, much smaller than $r_{ds}$, and the output frequency being $r_{pass-gate}$ at high operating frequencies due to the feedback through the pass-gate circuit 204. Bandwidth improvements may be achieved in the transmitter front end due to the alternating current (AC) impedance being higher than the direct current (DC) impedance. The transmitter front end output capacitance, such as wire and bump capacitance, is thereby compensated to achieve higher bandwidths. The transceiver may also exhibit low impedance variation over a wide output signal range because the impedance in the driver saturation region is significantly reduced while the impedance in the driver linear region is less impacted. The output impedance of the transmitter front end may be tuned to account for process, voltage, and temperature (PCT) variations by adjusting the size of the pass-gate circuit 204, either at manufacture or dynamically during operational lifetime using the control logic 212 (e.g., using a PVT monitor and control circuit, many of which are well known and specified in the art). Likewise the input impedance of the receiver front end may be adjusted by tuning the size of the feedback driver circuit 208.

Tuning the driver circuit and/or pass-gate circuit output current may be done in manners well known in the art, such as by utilizing additional circuitry that alters the resistance/ impedance between VDD and the output node of the circuit in response to an applied voltage and/or current level (or digital code).

The receiver front end input impedance may be derived using a similar approach. At low frequency, a small input voltage disturbance δv will become $(g_m z_1)^2 \delta v$ after passing the driver circuits 210, where $g_m$ and $z_1$ are the transconductance and output impedance of each driver circuit 210 (e.g., when they are implemented as inverters) assuming both are of the same size. Therefore, the feedback driver circuit 208 will create an output current of $g_m(g_m z_1)^2 \delta v$, leading to an input impedance for the receiver front end of $1/g_m(g_m z_1)^2$. Therefore, only a smaller feedback driver circuit 208 is desired to match the channel impedance at low frequency where $z_1$ is close to $r_{ds}$ of the driver (e.g., inverter) devices. At the frequency close to the ring oscillator natural frequency where $(g_m z_1)^3 = -1$, the feedback current is close to the opposite phase and the input impedance is close to $-1/g_m$. The negative impedance amplifies the incoming signal waveform from the data line 202 and creates a reflection that may be higher than the input as follows:

$$\Gamma = \frac{Z_L - Z_0}{Z_L + Z_0}$$

In summary, the impedance of the proposed receiver front end is small at low frequency and high at high frequency, with opposite phase. This peaking characteristic helps to boost the bandwidth response at the receiver front end.

Although depicted with a single pass-gate circuit 204, the PAM-2 transceiver 200 may be readily adapted to utilize multiple pass-gate circuits 204 in series or in parallel in the transmitter front end feedback path, zero or more of which are tunable. Likewise the last-stage driver circuit 206 may be implemented as multiple driver circuits in series or in parallel. Although depicted with two driver circuits 210, other embodiments may utilize more or fewer than two. Some embodiments may utilize more than one feedback driver circuit 208 in the feedback path of the receiver front end, either in series or in parallel, with zero or more of the feedback driver circuits 208 being tunable.

Figure 3:
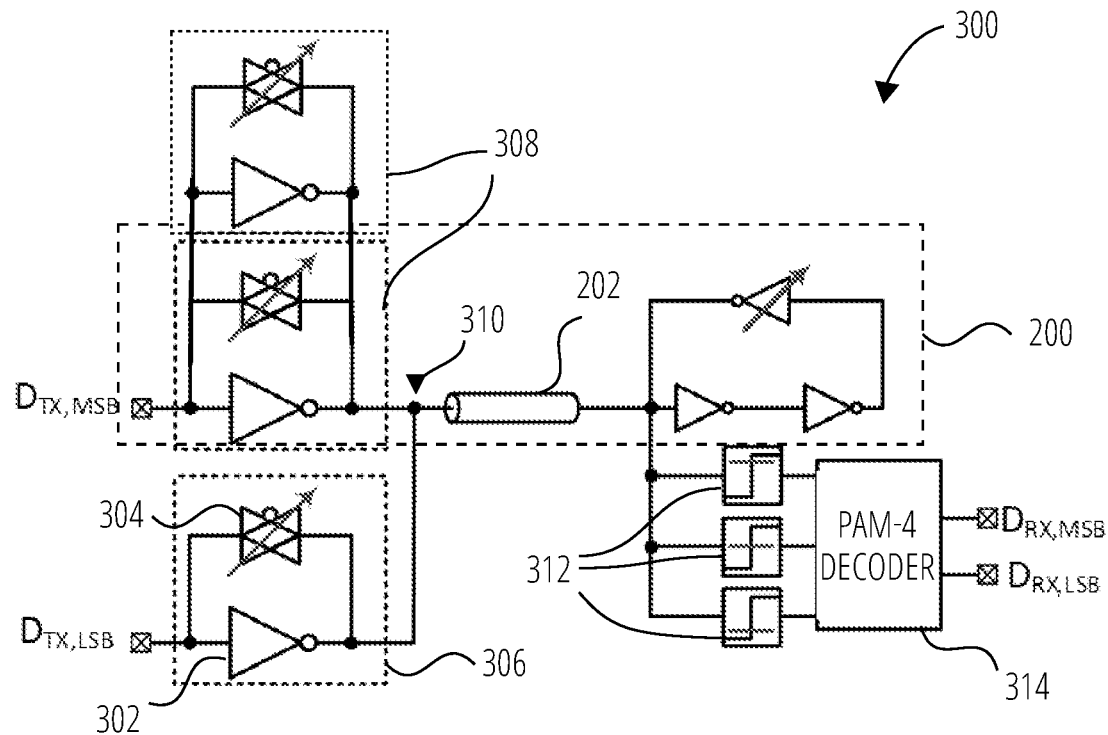
FIG. 3 depicts a PAM-4 transceiver 300 in accordance with one embodiment.

A PAM-4 transceiver 300 in one embodiment is depicted in FIG. 3. The PAM-4 transceiver 300 comprises a transmitter front end comprising three stages each comprising a driver circuit 302 and a tunable pass-gate circuit 304. The transmitter front end comprises an LSB stage 306 (for PAM encoding a Least Significant Bit of a data value) and two MSB stages 308 (for encoding a Most Significant Bit of the data value). Current from the stages is merged at a data line node 310 to generate a PAM-4 symbol on the data line 202. The PAM-4 transceiver 300 receiver front end includes components of the PAM-2 transceiver 200 and additionally comprises data slicer circuits 312 and a PAM decoder logic 314. The slicer circuits 312 are a well known feature of PAM receivers and will not be elaborated on further herein.

On the transmitter side, the LSB stage 306 is applied to generate the voltage level in the transmitted PAM-4 symbol for the least significant bit of the data value, while the MSB stages 308 are applied to generate the voltage level for the most significant bit of the symbol. On the receiver side, the same ring oscillator structure as utilized in the PAM-2 transceiver 200 may be utilized for termination and bandwidth boosting of the symbols received from the data line 202. Three slicer circuits 312 with different thresholds are coupled to the data line 202 output, followed by PAM decoder logic 314 to recover the bits from the PAM-4 symbols.

The slicer circuits 312 are utilized because of the existence of four voltage levels in PAM-4 symbols. The slicer circuits 312 may be coupled directly to the data line 202 or at the $D_{RX}$ terminals.

It will be readily apparent to those of ordinary skill in the art that the PAM-4 transceiver 300 may be adapted to PAM-N transceivers (where N>4) by adding additional contributing branches to the data line node 310, each branch comprising one, two, or more stages to contribute voltage/current for different PAM symbol levels on the data line 202, adding an appropriate number of slicer circuits to the receiver front end circuit, and modifying the decoder logic to decode the appropriate N-level PAM symbol (many such PAM-N decoder designs being well known in the art). Likewise it will be readily apparent in like fashion how to modify the PAM-4 transceiver 300 for PAM-3 communication.

The sizes of the driver circuits (in some embodiments be CMOS inverters) in the PAM-2 transceiver 200 or PAM-4 transceiver 300 may be varied according to the implementation to trade off power consumption and die area against frequency response characteristics. Likewise the pass-gate circuits may be implemented in CMOS of various sizes to meet design constraints.

Figure 4:
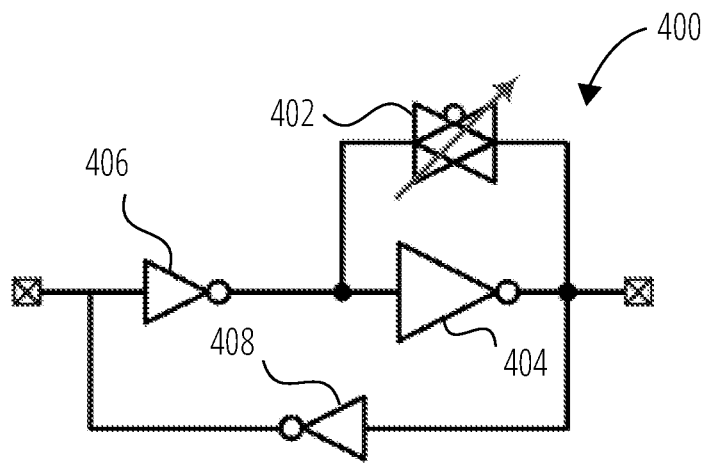
FIG. 4 depicts a transmitter frontend circuit 400 in accordance with one embodiment.
Figure 5:
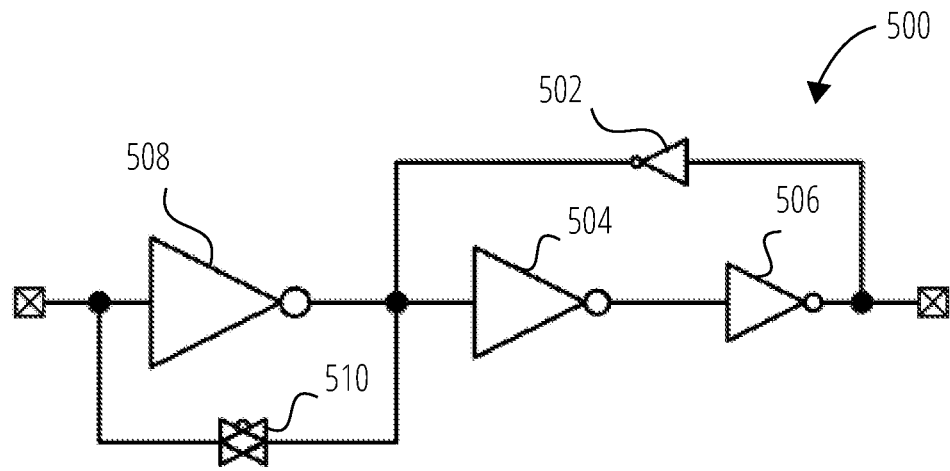
FIG. 5 depicts a receiver frontend circuit 500 in accordance with one embodiment.

FIG. 4 depicts a transmitter frontend circuit 400 in another embodiment, and FIG. 5 depicts a receiver frontend circuit 500 in another embodiment. The transmitter frontend circuit 400 comprises a pass-gate circuit 402 in a feedback path across only a last-stage driver circuit 404. The transmitter frontend circuit 400 further comprises an additional driver circuit 406 in series with the last-stage driver circuit 404, and a driver circuit 408 in a second feedback path across both of the driver circuit 406 and the last-stage driver circuit 404, forming a ring oscillator. The receiver frontend circuit 500 comprises a ring oscillator comprising a driver circuit 502 in a feedback path across both of a driver circuit 504 and a driver circuit 506. The receiver frontend circuit 500 further comprises a driver circuit 508 supplying the ring oscillator, and a pass-gate circuit 510 in a second feedback path across the driver circuit 508.

In the transmitter frontend circuit 400, the output impedance at low frequency may be further reduced and the value at high frequency is further improved over the PAM-2 transceiver 200 by utilizing this ring oscillator structure.

Each of the driver circuits in both the transmitter frontend circuit 400 and receiver frontend circuit 500 may be implemented as CMOS inverters. The sizes of these components may be varied according to the implementation to trade off power consumption and die area against frequency response characteristics. Likewise the pass-gate circuits may be implemented in CMOS of various sizes to meet design constraints. Some embodiments may utilize additional driver circuits and/or pass-gate circuits in series or in parallel combinations in the ring oscillators and feedback paths, as desired to meet design constraints.

Figure 6:
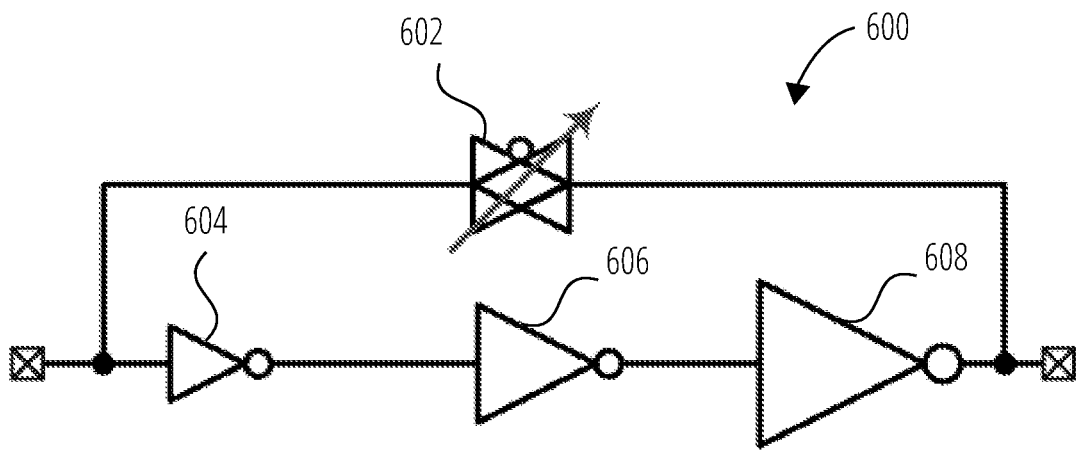
FIG. 6 depicts a feed-back stage 600 in accordance with one embodiment.
Figure 7:
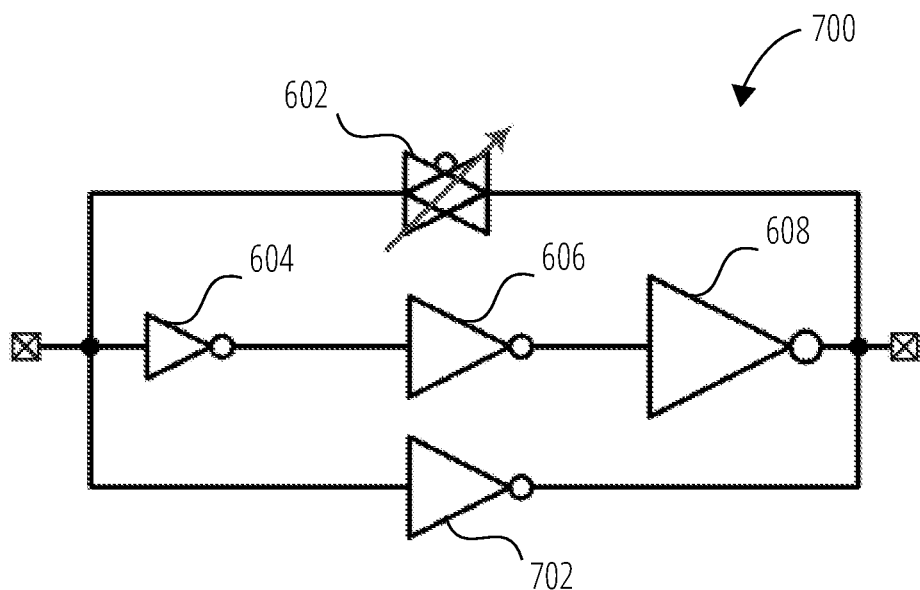
FIG. 7 depicts a feed-forward stage 700 in accordance with one embodiment.

In some embodiments, a feedback path comprising the pass-gate circuit 602 in either the transmitter front end or the receiver front end may be across three or more driver circuits (e.g., inverters 604, 606, and 608) instead of one, as depicted in the feed-back stage 600 of FIG. 6. The driver circuits/inverters may be of various sizes according to bandwidth/area/power constraints of the implementation. The feedback path for the pass-gate circuit 602 may also be combined with feed forward path (e.g., through one or more driver circuit 702/inverter) as depicted in the feed-forward stage 700 of FIG. 7.

Figure 8:
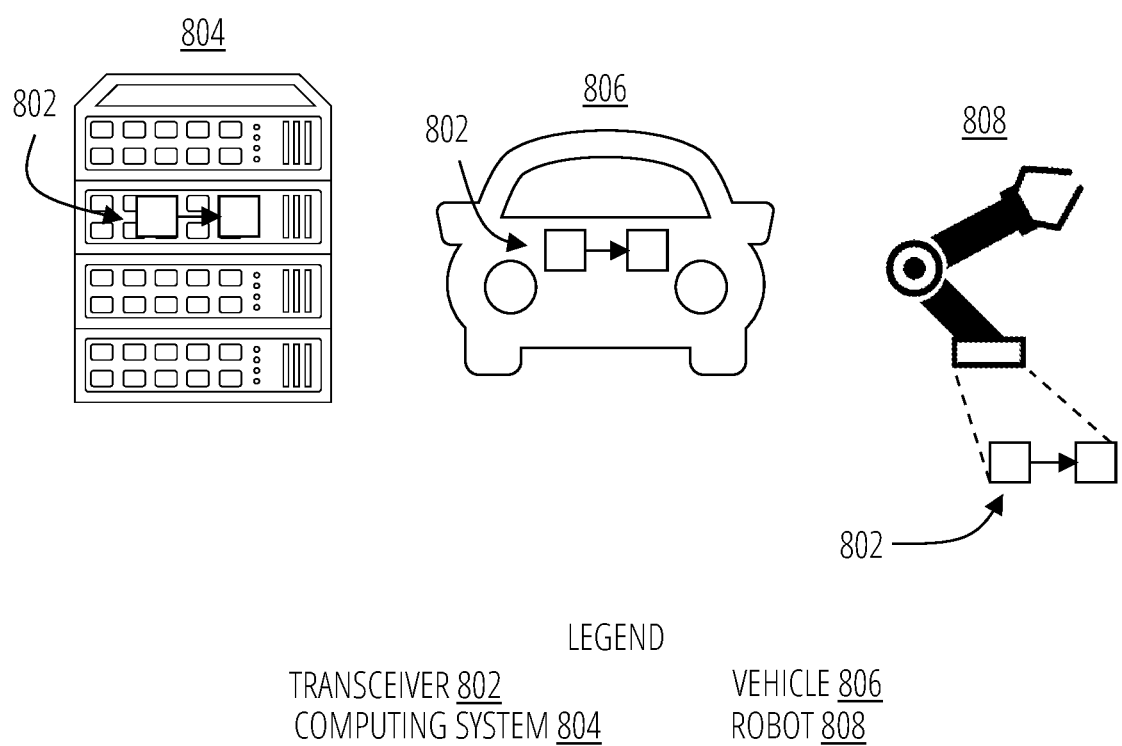
FIG. 8 depicts various commercial applications of a transceiver 802 in accordance with one embodiment.

FIG. 8 depicts exemplary scenarios for use of a transceiver 802 with XSR links in accordance with some embodiments. Such a transceiver 802 may be utilized in a computing system 804 (for example in a data center 900), a vehicle 806, and a robot 808, to name just a few examples. The transceiver 802 is generally a digital circuit receiving inputs from a clock circuit and a power supply.

Figure 9:
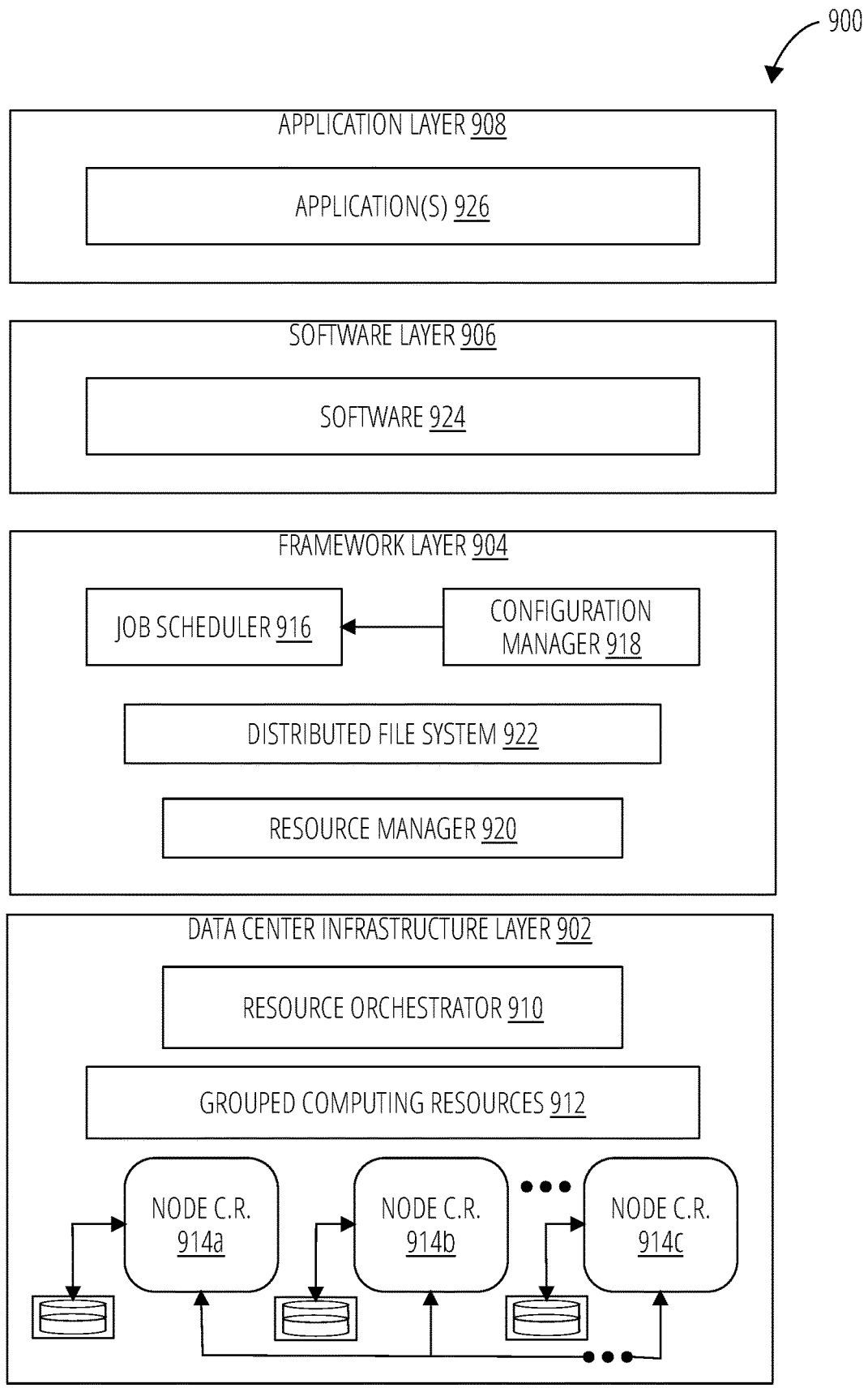
FIG. 9 depicts an exemplary data center 900 architecture in accordance with one embodiment.

FIG. 9 depicts an exemplary data center 900 that may utilize many such transceivers 802. In at least one embodiment, the data center 900 includes, without limitation, a data center infrastructure layer 902, a framework layer 904, software layer 906, and an application layer 908.

In at least one embodiment, as depicted in FIG. 9, data center infrastructure layer 902 may include a resource orchestrator 910, grouped computing resources 912, and node computing resources ("node C.R.s") Node C.R. 914a, Node C.R. 914b, Node C.R. 914c, . . . node C.R. N), where "N" represents any whole, positive integer. In at least one embodiment, node C.R.s may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s may be a server having one or more of above-mentioned computing resources. The node C.R.s may communicate internally and/or among one another using transceivers in accordance with the embodiments described herein.

In at least one embodiment, grouped computing resources 912 may include separate groupings of node C.R.s housed within one or more racks (not shown), or many racks housed in data centers at various geographical locations (also not shown). Separate groupings of node C.R.s within grouped computing resources 912 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 910 may configure or otherwise control one or more node C.R.s and/or grouped computing resources 912. In at least one embodiment, resource orchestrator 910 may include a software design infrastructure ("SDI") management entity for data center 900. In at least one embodiment, resource orchestrator 910 may include hardware, software or some combination thereof.

In at least one embodiment, as depicted in FIG. 9, framework layer 904 includes, without limitation, a job scheduler 916, a configuration manager 918, a resource manager 920, and a distributed file system 922. In at least one embodiment, framework layer 904 may include a framework to support software 924 of software layer 906 and/or one or more application(s) 926 of application layer 220. In at least one embodiment, software 924 or application(s) 926 may respectively include web-based service software or applications, such as those provided by Amazon Web Services, Google Cloud and Microsoft Azure. In at least one embodiment, framework layer 904 may be, but is not limited to, a type of free and open-source software web application framework such as Apache Spark™ (hereinafter "Spark") that may utilize a distributed file system 922 for large-scale data processing (e.g., "big data"). In at least one embodiment, job scheduler 916 may include a Spark driver to facilitate scheduling of workloads supported by various layers of data center 900. In at least one embodiment, configuration manager 918 may be capable of configuring different layers such as software layer 906 and framework layer 904, including Spark and distributed file system 922 for supporting large-scale data processing. In at least one embodiment, resource manager 920 may be capable of managing clustered or grouped computing resources mapped to or allocated for support of distributed file system 922 and distributed file system 922. In at least one embodiment, clustered or grouped computing resources may include grouped computing resources 912 at data center infrastructure layer 902. In at least one embodiment, resource manager 920 may coordinate with resource orchestrator 910 to manage these mapped or allocated computing resources.

In at least one embodiment, software 924 included in software layer 906 may include software used by at least portions of node C.R.s, grouped computing resources 912, and/or distributed file system 922 of framework layer 904. One or more types of software may include, but are not limited to, Internet web page search software, e-mail virus scan software, database software, and streaming video content software.

In at least one embodiment, application(s) 926 included in application layer 908 may include one or more types of applications used by at least portions of node C.R.s, grouped computing resources 912, and/or distributed file system 922 of framework layer 904. In at least one or more types of applications may include, without limitation, CUDA applications, 5G network applications, artificial intelligence application, data center applications, and/or variations thereof.

In at least one embodiment, any of configuration manager 918, resource manager 920, and resource orchestrator 910 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

The transceivers disclosed herein may be utilized by computing devices comprising one or more graphic processing unit (GPU) and/or general purpose data processor (e.g., a 'central processing unit or CPU). Exemplary architectures will now be described that may utilize such transceivers.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";

"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 10:
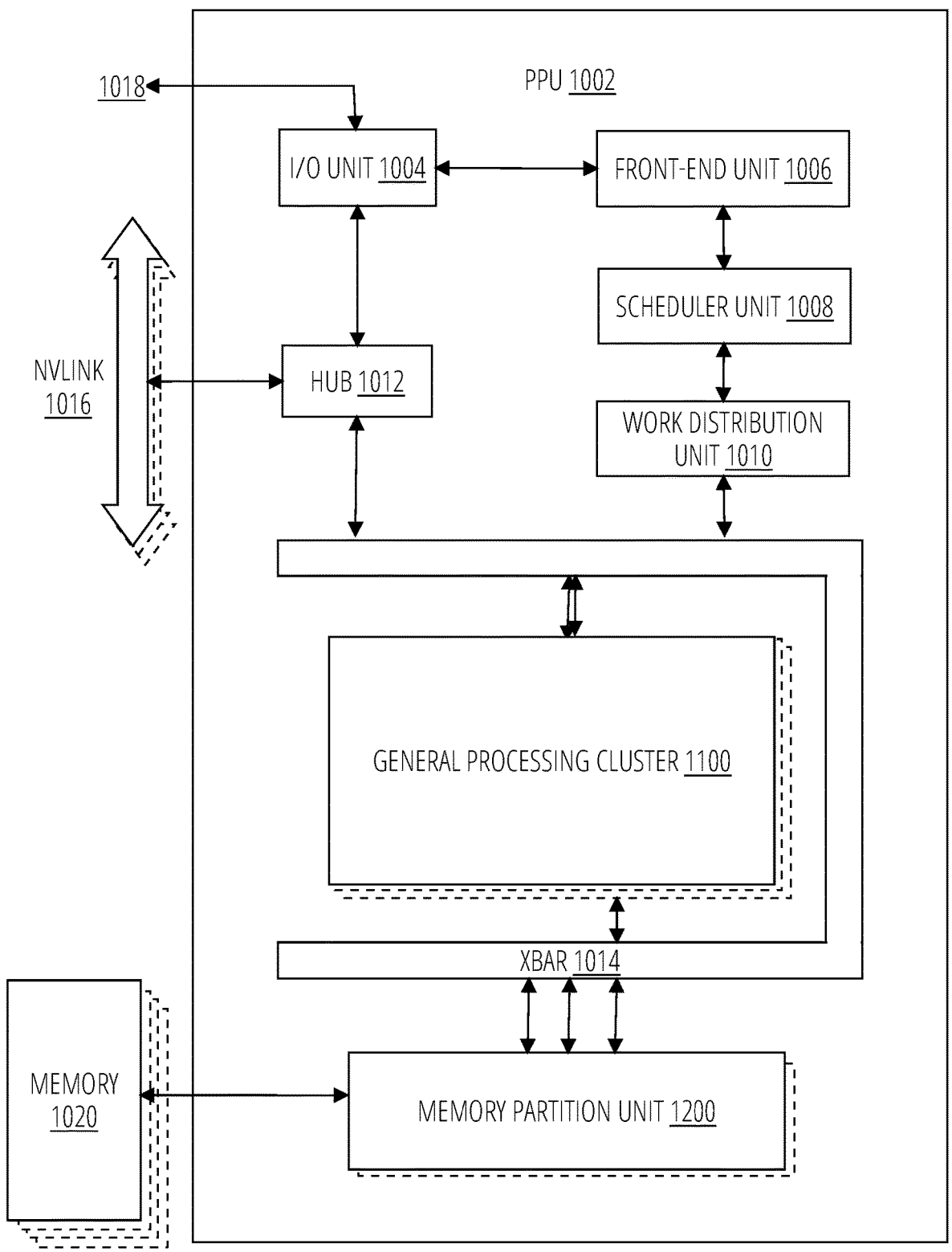
FIG. 10 depicts a parallel processing unit 1002 in accordance with one embodiment.

FIG. 10 depicts a parallel processing unit 1002, in accordance with an embodiment. In an embodiment, the parallel processing unit 1002 is a multi-threaded processor that is implemented on one or more integrated circuit devices. The parallel processing unit 1002 is a latency hiding architecture designed to process many threads in parallel. A thread (e.g., a thread of execution) is an instantiation of a set of instructions configured to be executed by the parallel processing unit 1002. In an embodiment, the parallel processing unit 1002 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1002 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1002 modules may be configured to accelerate thousands of High Performance Computing (HPC), data center, and machine learning applications. The parallel processing unit 1002 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the parallel processing unit 1002 includes an I/O unit 1004, a front-end unit 1006, a scheduler unit 1008, a work distribution unit 1010, a hub 1012, a crossbar 1014, one or more general processing cluster 1100 modules, and one or more memory partition unit 1200 modules. The parallel processing unit 1002 may be connected to a host processor or other parallel processing unit 1002 modules via one or more high-speed NVLink 1016 interconnects. The parallel processing unit 1002 may be connected to a host processor or other peripheral devices via an interconnect 1018. The parallel processing unit 1002 may also be connected to a local memory comprising a number of memory 1020 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1020 may comprise logic to configure the parallel processing unit 1002 to carry out aspects of the techniques disclosed herein.

The NVLink 1016 interconnect enables systems to scale and include one or more parallel processing unit 1002 modules combined with one or more CPUs, supports cache coherence between the parallel processing unit 1002 modules and CPUs, and CPU mastering. Data and/or commands may be transmitted by the NVLink 1016 through the hub 1012 to/from other units of the parallel processing unit 1002 such as one or more copy engines, a video encoder, a video decoder, a power management unit, etc. (not explicitly shown). The NVLink 1016 is described in more detail in conjunction with FIG. 14.

The I/O unit 1004 is configured to transmit and receive communications (e.g., commands, data, etc.) from a host processor (not shown) over the interconnect 1018. The I/O unit 1004 may communicate with the host processor directly via the interconnect 1018 or through one or more intermediate devices such as a memory bridge. In an embodiment, the I/O unit 1004 may communicate with one or more other processors, such as one or more parallel processing unit 1002 modules via the interconnect 1018. In an embodiment, the I/O unit 1004 implements a Peripheral Component Interconnect Express (PCIe) interface for communications over a PCIe bus and the interconnect 1018 is a PCIe bus. In alternative embodiments, the I/O unit 1004 may implement other types of well-known interfaces for communicating with external devices.

The I/O unit 1004 decodes packets received via the interconnect 1018. In an embodiment, the packets represent commands configured to cause the parallel processing unit 1002 to perform various operations. The I/O unit 1004 transmits the decoded commands to various other units of the parallel processing unit 1002 as the commands may specify. For example, some commands may be transmitted to the front-end unit 1006. Other commands may be transmitted to the hub 1012 or other units of the parallel processing unit 1002 such as one or more copy engines, a video encoder, a video decoder, a power management unit, etc. (not explicitly shown). In other words, the I/O unit 1004 is configured to route communications between and among the various logical units of the parallel processing unit 1002.

In an embodiment, a program executed by the host processor encodes a command stream in a buffer that provides workloads to the parallel processing unit 1002 for processing. A workload may comprise several instructions and data to be processed by those instructions. The buffer is a region in a memory that is accessible (e.g., read/write) by both the host processor and the parallel processing unit 1002. For example, the I/O unit 1004 may be configured to access the buffer in a system memory connected to the interconnect 1018 via memory requests transmitted over the interconnect 1018. In an embodiment, the host processor writes the command stream to the buffer and then transmits a pointer to the start of the command stream to the parallel processing unit 1002. The front-end unit 1006 receives pointers to one or more command streams. The front-end unit 1006 manages the one or more streams, reading commands from the streams and forwarding commands to the various units of the parallel processing unit 1002.

The front-end unit 1006 is coupled to a scheduler unit 1008 that configures the various general processing cluster 1100 modules to process tasks defined by the one or more streams. The scheduler unit 1008 is configured to track state information related to the various tasks managed by the scheduler unit 1008. The state may indicate which general processing cluster 1100 a task is assigned to, whether the task is active or inactive, a priority level associated with the task, and so forth. The scheduler unit 1008 manages the execution of a plurality of tasks on the one or more general processing cluster 1100 modules.

The scheduler unit 1008 is coupled to a work distribution unit 1010 that is configured to dispatch tasks for execution on the general processing cluster 1100 modules. The work distribution unit 1010 may track a number of scheduled tasks received from the scheduler unit 1008. In an embodiment, the work distribution unit 1010 manages a pending task pool and an active task pool for each of the general processing cluster 1100 modules. The pending task pool may comprise a number of slots (e.g., 32 slots) that contain tasks assigned to be processed by a particular general processing cluster 1100. The active task pool may comprise a number of slots (e.g., 4 slots) for tasks that are actively being processed by the general processing cluster 1100 modules. As a general processing cluster 1100 finishes the execution of a task, that task is evicted from the active task pool for the general processing cluster 1100 and one of the other tasks from the pending task pool is selected and scheduled for execution on the general processing cluster 1100. If an active task has been idle on the general processing cluster 1100, such as while waiting for a data dependency to be resolved, then the active task may be evicted from the general processing cluster 1100 and returned to the pending task pool while another task in the pending task pool is selected and scheduled for execution on the general processing cluster 1100.

The work distribution unit 1010 communicates with the one or more general processing cluster 1100 modules via crossbar 1014. The crossbar 1014 is an interconnect network that couples many of the units of the parallel processing unit 1002 to other units of the parallel processing unit 1002. For example, the crossbar 1014 may be configured to couple the work distribution unit 1010 to a particular general processing cluster 1100. Although not shown explicitly, one or more other units of the parallel processing unit 1002 may also be connected to the crossbar 1014 via the hub 1012.

The tasks are managed by the scheduler unit 1008 and dispatched to a general processing cluster 1100 by the work distribution unit 1010. The general processing cluster 1100 is configured to process the task and generate results. The results may be consumed by other tasks within the general processing cluster 1100, routed to a different general processing cluster 1100 via the crossbar 1014, or stored in the memory 1020. The results can be written to the memory 1020 via the memory partition unit 1200 modules, which implement a memory interface for reading and writing data to/from the memory 1020. The results can be transmitted to another parallel processing unit 1002 or CPU via the NVLink 1016. In an embodiment, the parallel processing unit 1002 includes a number U of memory partition unit 1200 modules that is equal to the number of separate and distinct memory 1020 devices coupled to the parallel processing unit 1002. A memory partition unit 1200 will be described in more detail below in conjunction with FIG. 12.

In an embodiment, a host processor executes a driver kernel that implements an application programming interface (API) that enables one or more applications executing on the host processor to schedule operations for execution on the parallel processing unit 1002. In an embodiment, multiple compute applications are simultaneously executed by the parallel processing unit 1002 and the parallel processing unit 1002 provides isolation, quality of service (QoS), and independent address spaces for the multiple compute applications. An application may generate instructions (e.g., API calls) that cause the driver kernel to generate one or more tasks for execution by the parallel processing unit 1002. The driver kernel outputs tasks to one or more streams being processed by the parallel processing unit 1002. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 13.

Figure 11:
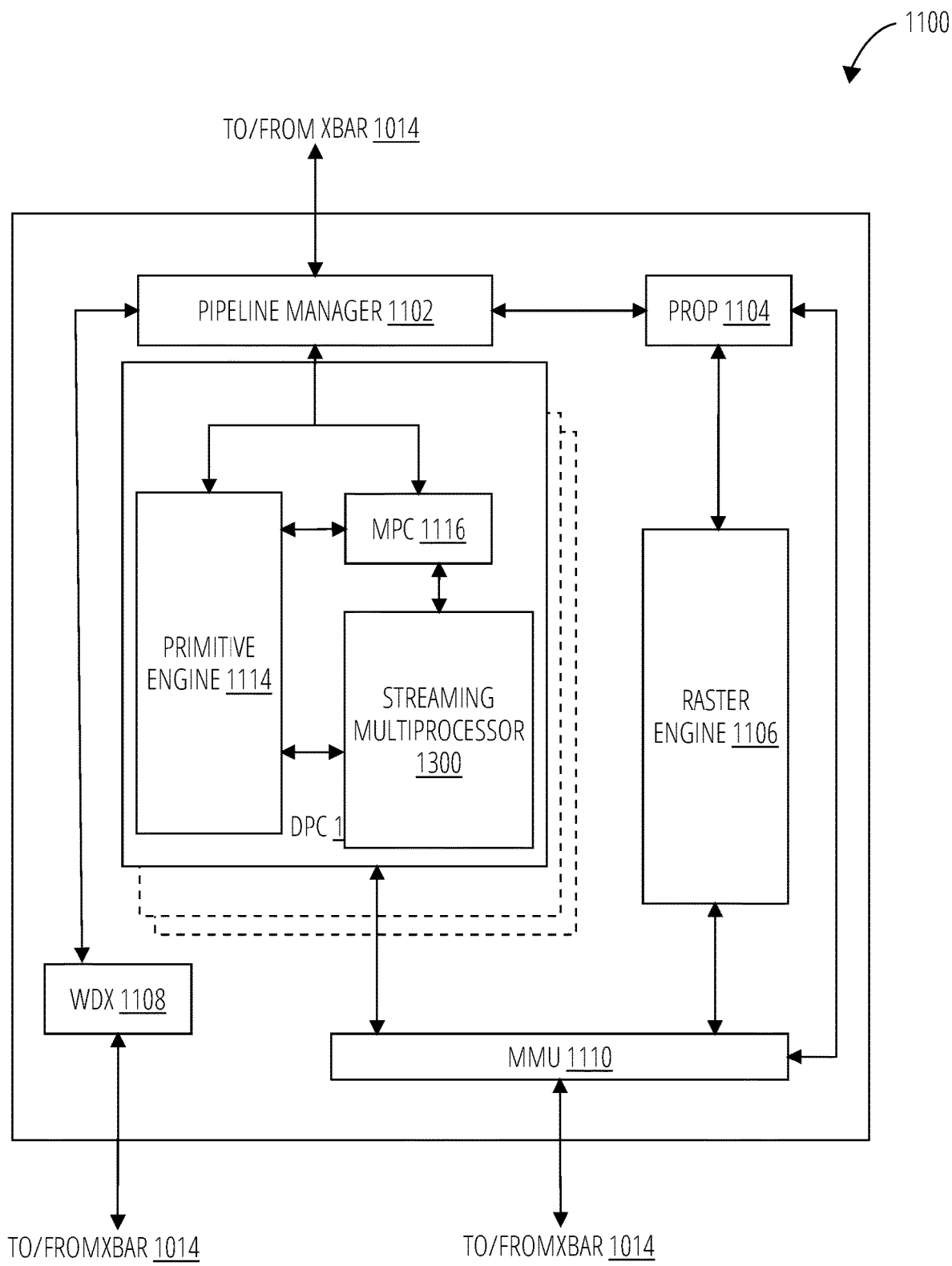
FIG. 11 depicts a general processing cluster 1100 in accordance with one embodiment.

FIG. 11 depicts a general processing cluster 1100 of the parallel processing unit 1002 of FIG. 10, in accordance with an embodiment. As shown in FIG. 11, each general processing cluster 1100 includes a number of hardware units for processing tasks. In an embodiment, each general processing cluster 1100 includes a pipeline manager 1102, a pre-raster operations unit 1104, a raster engine 1106, a work distribution crossbar 1108, a memory management unit 1110, and one or more data processing cluster 1112. It will be appreciated that the general processing cluster 1100 of FIG. 11 may include other hardware units in lieu of or in addition to the units shown in FIG. 11.

In an embodiment, the operation of the general processing cluster 1100 is controlled by the pipeline manager 1102. The pipeline manager 1102 manages the configuration of the one or more data processing cluster 1112 modules for processing tasks allocated to the general processing cluster 1100. In an embodiment, the pipeline manager 1102 may configure at least one of the one or more data processing cluster 1112 modules to implement at least a portion of a graphics rendering pipeline. For example, a data processing cluster 1112 may be configured to execute a vertex shader program on the programmable streaming multiprocessor 1300. The pipeline manager 1102 may also be configured to route packets received from the work distribution unit 1010 to the appropriate logical units within the general processing cluster 1100. For example, some packets may be routed to fixed function hardware units in the pre-raster operations unit 1104 and/or raster engine 1106 while other packets may be routed to the data processing cluster 1112 modules for processing by the primitive engine 1114 or the streaming multiprocessor 1300. In an embodiment, the pipeline manager 1102 may configure at least one of the one or more data processing cluster 1112 modules to implement a neural network model and/or a computing pipeline.

Figure 12:
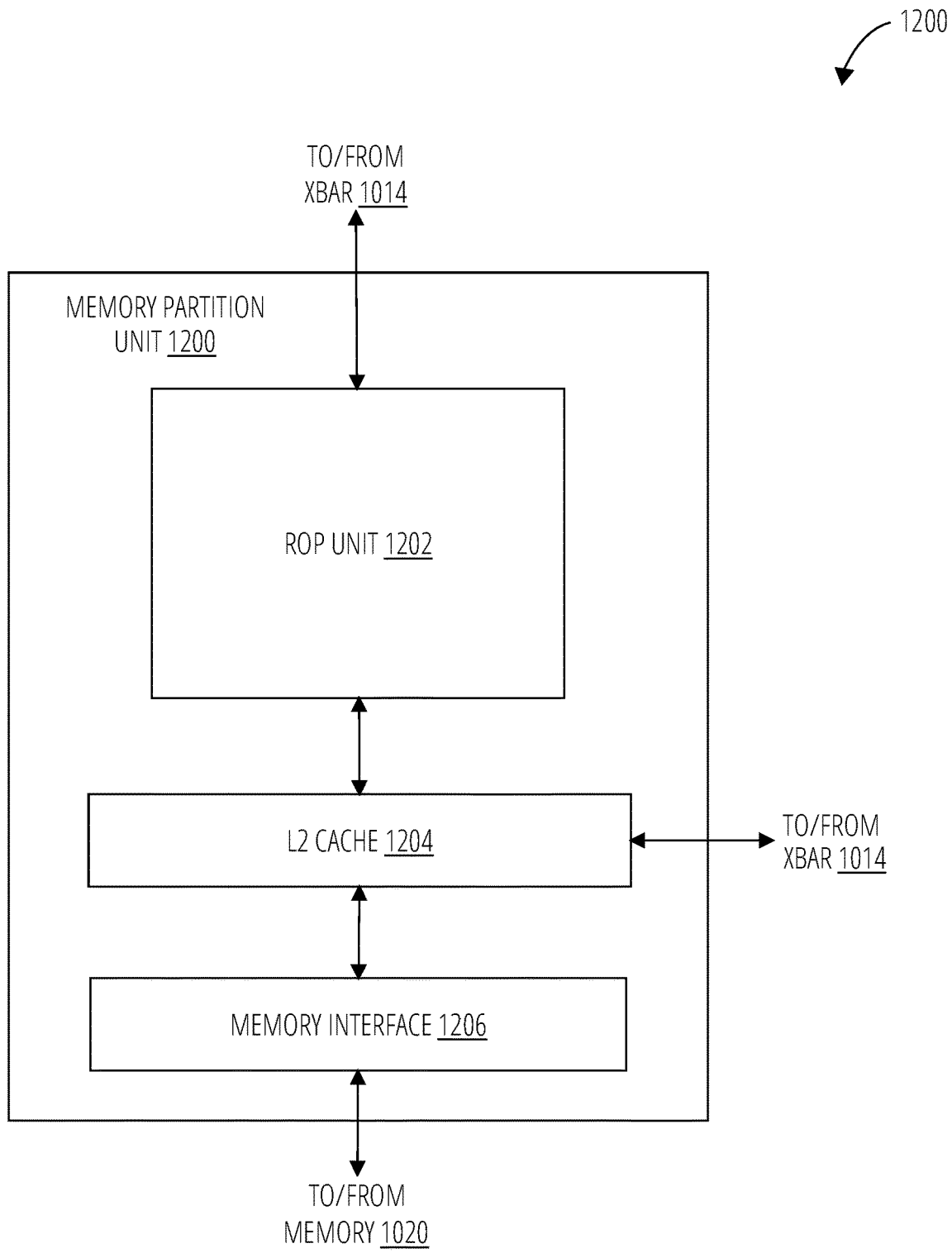
FIG. 12 depicts a memory partition unit 1200 in accordance with one embodiment.

The pre-raster operations unit 1104 is configured to route data generated by the raster engine 1106 and the data processing cluster 1112 modules to a Raster Operations (ROP) unit, described in more detail in conjunction with FIG. 12. The pre-raster operations unit 1104 may also be configured to perform optimizations for color blending, organize pixel data, perform address translations, and the like.

The raster engine 1106 includes a number of fixed function hardware units configured to perform various raster operations. In an embodiment, the raster engine 1106 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1106 comprises fragments to be processed, for example, by a fragment shader implemented within a data processing cluster 1112.

Each data processing cluster 1112 included in the general processing cluster 1100 includes an M-pipe controller 1116, a primitive engine 1114, and one or more streaming multi-processor 1300 modules. The M-pipe controller 1116 controls the operation of the data processing cluster 1112, routing packets received from the pipeline manager 1102 to the appropriate units in the data processing cluster 1112. For example, packets associated with a vertex may be routed to the primitive engine 1114, which is configured to fetch vertex attributes associated with the vertex from the memory 1020. In contrast, packets associated with a shader program may be transmitted to the streaming multiprocessor 1300.

The streaming multiprocessor 1300 comprises a programmable streaming processor that is configured to process tasks represented by a number of threads. Each streaming multiprocessor 1300 is multi-threaded and configured to execute a plurality of threads (e.g., 32 threads) from a particular group of threads concurrently. In an embodiment, the streaming multiprocessor 1300 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1300 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1300 will be described in more detail below in conjunction with FIG. 13.

The memory management unit 1110 provides an interface between the general processing cluster 1100 and the memory partition unit 1200. The memory management unit 1110 may provide translation of virtual addresses into physical addresses, memory protection, and arbitration of memory requests. In an embodiment, the memory management unit 1110 provides one or more translation lookaside buffers (TLBs) for performing translation of virtual addresses into physical addresses in the memory 1020.

FIG. 12 depicts a memory partition unit 1200 of the parallel processing unit 1002 of FIG. 10, in accordance with an embodiment. As shown in FIG. 12, the memory partition unit 1200 includes a raster operations unit 1202, a level two cache 1204, and a memory interface 1206. The memory interface 1206 is coupled to the memory 1020. Memory interface 1206 may implement 32, 64, 128, 1024-bit data buses, or the like, for high-speed data transfer. In an embodiment, the parallel processing unit 1002 incorporates U memory interface 1206 modules, one memory interface 1206 per pair of memory partition unit 1200 modules, where each pair of memory partition unit 1200 modules is connected to a corresponding memory 1020 device. For example, parallel processing unit 1002 may be connected to up to Y memory 1020 devices, such as high bandwidth memory stacks or graphics double-data-rate, version 5, synchronous dynamic random access memory, or other types of persistent storage.

In an embodiment, the memory interface 1206 implements an HBM2 memory interface and Y equals half U. In an embodiment, the HBM2 memory stacks are located on the same physical package as the parallel processing unit 1002, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1020 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1002 modules process very large datasets and/or run applications for extended periods.

In an embodiment, the parallel processing unit 1002 implements a multi-level memory hierarchy. In an embodiment, the memory partition unit 1200 supports a unified memory to provide a single unified virtual address space for CPU and parallel processing unit 1002 memory, enabling data sharing between virtual memory systems. In an embodiment the frequency of accesses by a parallel processing unit 1002 to memory located on other processors is traced to ensure that memory pages are moved to the physical memory of the parallel processing unit 1002 that is accessing the pages more frequently. In an embodiment, the NVLink 1016 supports address translation services allowing the parallel processing unit 1002 to directly access a CPU's page tables and providing full access to CPU memory by the parallel processing unit 1002.

In an embodiment, copy engines transfer data between multiple parallel processing unit 1002 modules or between parallel processing unit 1002 modules and CPUs. The copy engines can generate page faults for addresses that are not mapped into the page tables. The memory partition unit 1200 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1020 or other system memory may be fetched by the memory partition unit 1200 and stored in the level two cache 1204, which is located on-chip and is shared between the various general processing cluster 1100 modules. As shown, each memory partition unit 1200 includes a portion of the level two cache 1204 associated with a corresponding memory 1020 device. Lower level caches may then be implemented in various units within the general processing cluster 1100 modules. For example, each of the streaming multiprocessor 1300 modules may implement an L1 cache. The L1 cache is private memory that is dedicated to a particular streaming multiprocessor 1300. Data from the level two cache 1204 may be fetched and stored in each of the L1 caches for processing in the functional units of the streaming multiprocessor 1300 modules. The level two cache 1204 is coupled to the memory interface 1206 and the crossbar 1014.

The raster operations unit 1202 performs graphics raster operations related to pixel color, such as color compression, pixel blending, and the like. The raster operations unit 1202 also implements depth testing in conjunction with the raster engine 1106, receiving a depth for a sample location associated with a pixel fragment from the culling engine of the raster engine 1106. The depth is tested against a corresponding depth in a depth buffer for a sample location associated with the fragment. If the fragment passes the depth test for the sample location, then the raster operations unit 1202 updates the depth buffer and transmits a result of the depth test to the raster engine 1106. It will be appreciated that the number of partition memory partition unit 1200 modules may be different than the number of general processing cluster 1100 modules and, therefore, each raster operations unit 1202 may be coupled to each of the general processing cluster 1100 modules. The raster operations unit 1202 tracks packets received from the different general processing cluster 1100 modules and determines which general processing cluster 1100 that a result generated by the raster operations unit 1202 is routed to through the crossbar 1014. Although the raster operations unit 1202 is included within the memory partition unit 1200 in FIG. 12, in other embodiment, the raster operations unit 1202 may be outside of the memory partition unit 1200. For example, the raster operations unit 1202 may reside in the general processing cluster 1100 or another unit.

Figure 13:
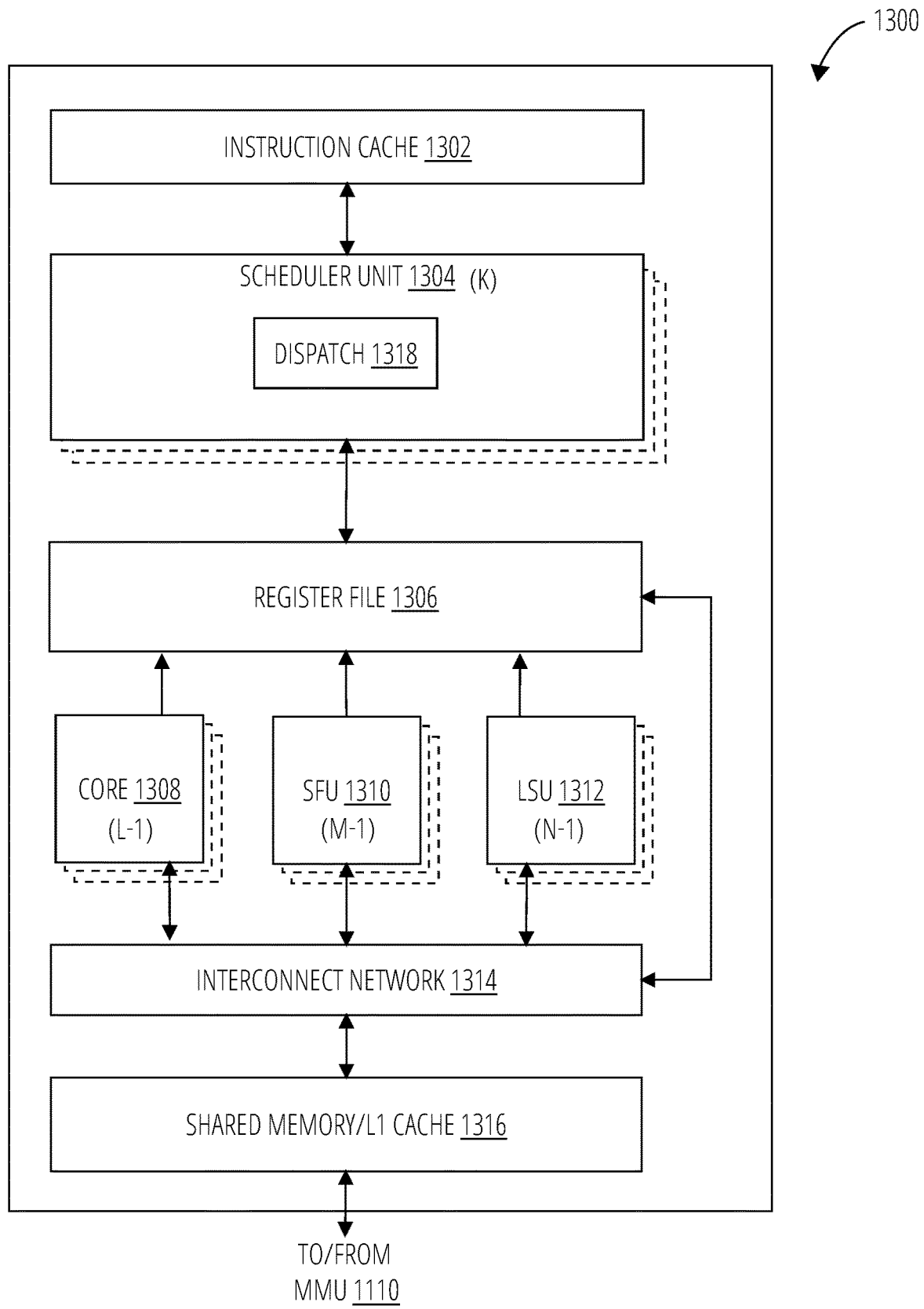
FIG. 13 depicts a streaming multiprocessor 1300 in accordance with one embodiment.

FIG. 13 illustrates the streaming multiprocessor 1300 of FIG. 11, in accordance with an embodiment. As shown in FIG. 13, the streaming multiprocessor 1300 includes an instruction cache 1302, one or more scheduler unit 1304 modules (e.g., such as scheduler unit 1008), a register file 1306, one or more processing core 1308 modules, one or more special function unit 1310 modules, one or more load/store unit 1312 modules, an interconnect network 1314, and a shared memory/L1 cache 1316.

As described above, the work distribution unit 1010 dispatches tasks for execution on the general processing cluster 1100 modules of the parallel processing unit 1002. The tasks are allocated to a particular data processing cluster 1112 within a general processing cluster 1100 and, if the task is associated with a shader program, the task may be allocated to a streaming multiprocessor 1300. The scheduler unit 1008 receives the tasks from the work distribution unit 1010 and manages instruction scheduling for one or more thread blocks assigned to the streaming multiprocessor 1300. The scheduler unit 1304 schedules thread blocks for execution as warps of parallel threads, where each thread block is allocated at least one warp. In an embodiment, each warp executes 32 threads. The scheduler unit 1304 may manage a plurality of different thread blocks, allocating the warps to the different thread blocks and then dispatching instructions from the plurality of different cooperative groups to the various functional units (e.g., core 1308 modules, special function unit 1310 modules, and load/store unit 1312 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1318 unit is configured within the scheduler unit 1304 to transmit instructions to one or more of the functional units. In one embodiment, the scheduler unit 1304 includes two dispatch 1318 units that enable two different instructions from the same warp to be dispatched during each clock cycle. In alternative embodiments, each scheduler unit 1304 may include a single dispatch 1318 unit or additional dispatch 1318 units.

Each streaming multiprocessor 1300 includes a register file 1306 that provides a set of registers for the functional units of the streaming multiprocessor 1300. In an embodiment, the register file 1306 is divided between each of the functional units such that each functional unit is allocated a dedicated portion of the register file 1306. In another embodiment, the register file 1306 is divided between the different warps being executed by the streaming multiprocessor 1300. The register file 1306 provides temporary storage for operands connected to the data paths of the functional units.

Each streaming multiprocessor 1300 comprises L processing core 1308 modules. In an embodiment, the streaming multiprocessor 1300 includes a large number (e.g., 128, etc.) of distinct processing core 1308 modules. Each core 1308 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1308 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1308 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1300 also comprises M special function unit 1310 modules that perform special functions (e.g., attribute evaluation, reciprocal square root, and the like). In an embodiment, the special function unit 1310 modules may include a tree traversal unit configured to traverse a hierarchical tree data structure. In an embodiment, the special function unit 1310 modules may include texture unit configured to perform texture map filtering operations. In an embodiment, the texture units are configured to load texture maps (e.g., a 2D array of texels) from the memory 1020 and sample the texture maps to produce sampled texture values for use in shader programs executed by the streaming multiprocessor 1300. In an embodiment, the texture maps are stored in the shared memory/L1 cache 1316. The texture units implement texture operations such as filtering operations using mip-maps (e.g., texture maps of varying levels of detail). In an embodiment, each streaming multiprocessor 1300 includes two texture units.

Each streaming multiprocessor 1300 also comprises N load/store unit 1312 modules that implement load and store operations between the shared memory/L1 cache 1316 and the register file 1306. Each streaming multiprocessor 1300 includes an interconnect network 1314 that connects each of the functional units to the register file 1306 and the load/store unit 1312 to the register file 1306 and shared memory/L1 cache 1316. In an embodiment, the interconnect network 1314 is a crossbar that can be configured to connect any of the functional units to any of the registers in the register file 1306 and connect the load/store unit 1312 modules to the register file 1306 and memory locations in shared memory/L1 cache 1316.

The shared memory/L1 cache 1316 is an array of on-chip memory that allows for data storage and communication between the streaming multiprocessor 1300 and the primitive engine 1114 and between threads in the streaming multiprocessor 1300. In an embodiment, the shared memory/L1 cache 1316 comprises 128 KB of storage capacity and is in the path from the streaming multiprocessor 1300 to the memory partition unit 1200. The shared memory/L1 cache 1316 can be used to cache reads and writes. One or more of the shared memory/L1 cache 1316, level two cache 1204, and memory 1020 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1316 enables the shared memory/L1 cache 1316 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 10, are bypassed, creating a much simpler programming model. In the general purpose parallel computation configuration, the work distribution unit 1010 assigns and distributes blocks of threads directly to the data processing cluster 1112 modules. The threads in a block execute the same program, using a unique thread ID in the calculation to ensure each thread generates unique results, using the streaming multiprocessor 1300 to execute the program and perform calculations, shared memory/L1 cache 1316 to communicate between threads, and the load/store unit 1312 to read and write global memory through the shared memory/L1 cache 1316 and the memory partition unit 1200. When configured for general purpose parallel computation, the streaming multiprocessor 1300 can also write commands that the scheduler unit 1008 can use to launch new work on the data processing cluster 1112 modules.

The parallel processing unit 1002 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1002 is embodied on a single semiconductor substrate. In another embodiment, the parallel processing unit 1002 is included in a system-on-a-chip (SoC) along with one or more other devices such as additional parallel processing unit 1002 modules, the memory 1020, a reduced instruction set computer (RISC) CPU, a memory management unit (MMU), a digital-to-analog converter (DAC), and the like.

In an embodiment, the parallel processing unit 1002 may be included on a graphics card that includes one or more memory devices. The graphics card may be configured to interface with a PCIe slot on a motherboard of a desktop computer. In yet another embodiment, the parallel processing unit 1002 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 14:
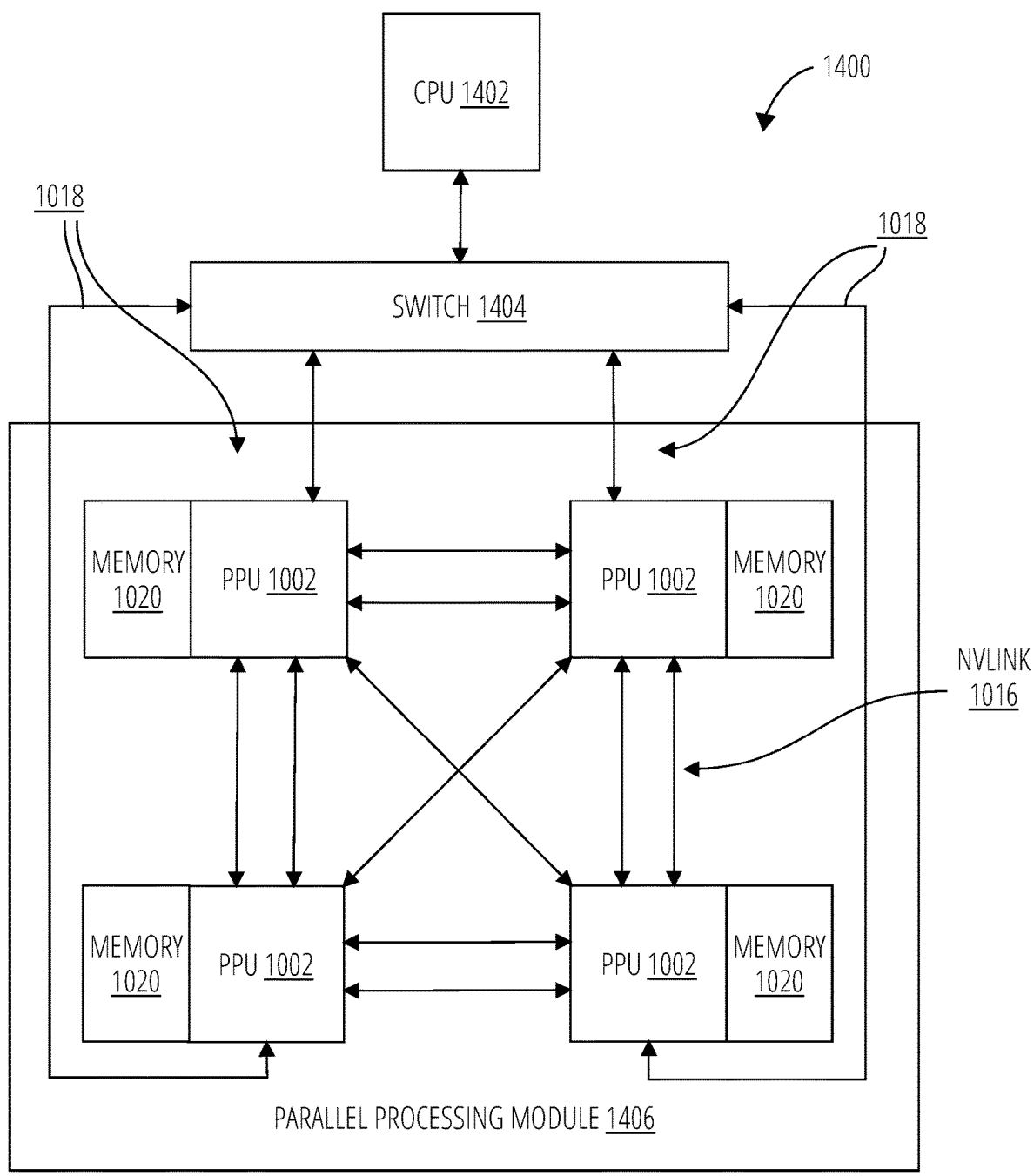
FIG. 14 depicts a processing system 1400 in accordance with one embodiment.

FIG. 14 is a conceptual diagram of a processing system 1400 implemented using the parallel processing unit 1002 of FIG. 10, in accordance with an embodiment. The processing system 1400 includes a central processing unit 1402, switch 1404, and multiple parallel processing unit 1002 modules each and respective memory 1020 modules. The NVLink 1016 provides high-speed communication links between each of the parallel processing unit 1002 modules. Although a particular number of NVLink 1016 and interconnect 1018 connections are illustrated in FIG. 14, the number of connections to each parallel processing unit 1002 and the central processing unit 1402 may vary. The switch 1404 interfaces between the interconnect 1018 and the central processing unit 1402. The parallel processing unit 1002 modules, memory 1020 modules, and NVLink 1016 connections may be situated on a single semiconductor platform to form a parallel processing module 1406. In an embodiment, the switch 1404 supports two or more protocols to interface between various different connections and/or links.

In another embodiment (not shown), the NVLink 1016 provides one or more high-speed communication links between each of the parallel processing unit modules (parallel processing unit 1002, parallel processing unit 1002, parallel processing unit 1002, and parallel processing unit 1002) and the central processing unit 1402 and the switch 1404 interfaces between the interconnect 1018 and each of the parallel processing unit modules. The parallel processing unit modules, memory 1020 modules, and interconnect 1018 may be situated on a single semiconductor platform to form a parallel processing module 1406. In yet another embodiment (not shown), the interconnect 1018 provides one or more communication links between each of the parallel processing unit modules and the central processing unit 1402 and the switch 1404 interfaces between each of the parallel processing unit modules using the NVLink 1016 to provide one or more high-speed communication links between the parallel processing unit modules. In another embodiment (not shown), the NVLink 1016 provides one or more high-speed communication links between the parallel processing unit modules and the central processing unit 1402 through the switch 1404. In yet another embodiment (not shown), the interconnect 1018 provides one or more communication links between each of the parallel processing unit modules directly. One or more of the NVLink 1016 high-speed communication links may be implemented as a physical NVLink interconnect or either an on-chip or on-die interconnect using the same protocol as the NVLink 1016.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1406 may be implemented as a circuit board substrate and each of the parallel processing unit modules and/or memory 1020 modules may be packaged devices. In an embodiment, the central processing unit 1402, switch 1404, and the parallel processing module 1406 are situated on a single semiconductor platform.

In an embodiment, the signaling rate of each NVLink 1016 is 20 to 25 Gigabits/second and each parallel processing unit module includes six NVLink 1016 interfaces (as shown in FIG. 14, five NVLink 1016 interfaces are included for each parallel processing unit module). Each NVLink 1016 provides a data transfer rate of 25 Gigabytes/second in each direction, with six links providing 300 Gigabytes/second. The NVLink 1016 can be used exclusively for PPU-to-PPU communication as shown in FIG. 14, or some combination of PPU-to-PPU and PPU-to-CPU, when the central processing unit 1402 also includes one or more NVLink 1016 interfaces.

In an embodiment, the NVLink 1016 allows direct load/store/atomic access from the central processing unit 1402 to each parallel processing unit module's memory 1020. In an embodiment, the NVLink 1016 supports coherency operations, allowing data read from the memory 1020 modules to be stored in the cache hierarchy of the central processing unit 1402, reducing cache access latency for the central processing unit 1402. In an embodiment, the NVLink 1016 includes support for Address Translation Services (ATS), enabling the parallel processing unit module to directly access page tables within the central processing unit 1402. One or more of the NVLink 1016 may also be configured to operate in a low-power mode.

Figure 15:
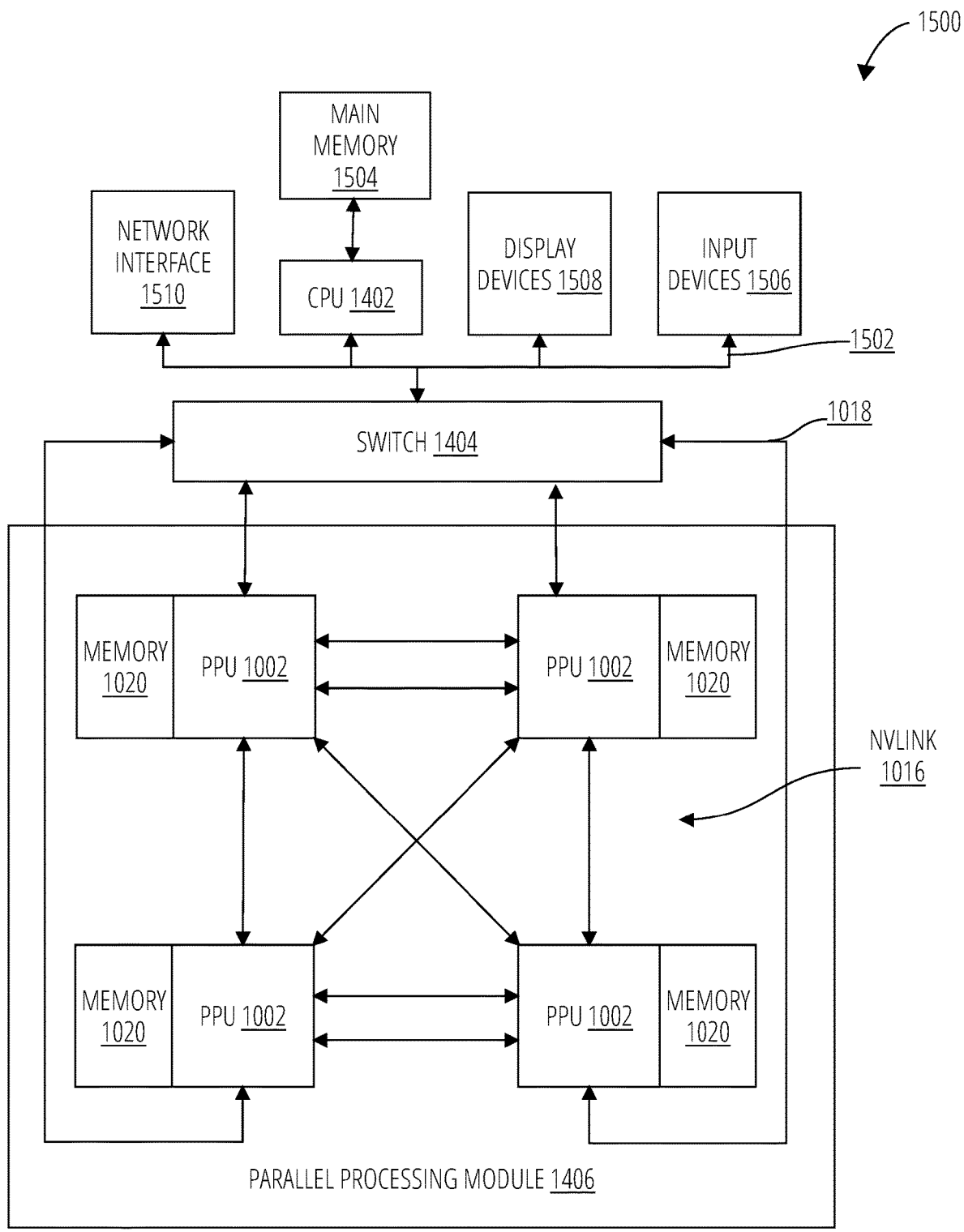
FIG. 15 depicts an exemplary processing system 1500 in accordance with another embodiment.

FIG. 15 depicts an exemplary processing system 1500 in which the various architecture and/or functionality of the various previous embodiments may be implemented. As shown, an exemplary processing system 1500 is provided including at least one central processing unit 1402 that is connected to a communications bus 1502. The communication communications bus 1502 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1500 also includes a main memory 1504. Control logic (software) and data are stored in the main memory 1504 which may take the form of random access memory (RAM).

The exemplary processing system 1500 also includes input devices 1506, the parallel processing module 1406, and display devices 1508, e.g. a conventional CRT (cathode ray tube), LCD (liquid crystal display), LED (light emitting diode), plasma display or the like. User input may be received from the input devices 1506, e.g., keyboard, mouse, touchpad, microphone, and the like. Each of the foregoing modules and/or devices may even be situated on a single semiconductor platform to form the exemplary processing system 1500. Alternately, the various modules may also be situated separately or in various combinations of semiconductor platforms per the desires of the user.

Further, the exemplary processing system 1500 may be coupled to a network (e.g., a telecommunications network, local area network (LAN), wireless network, wide area network (WAN) such as the Internet, peer-to-peer network, cable network, or the like) through a network interface 1510 for communication purposes.

The exemplary processing system 1500 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1504 and/or the secondary storage. Such computer programs, when executed, enable the exemplary processing system 1500 to perform various functions. The main memory 1504, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1500 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 16:
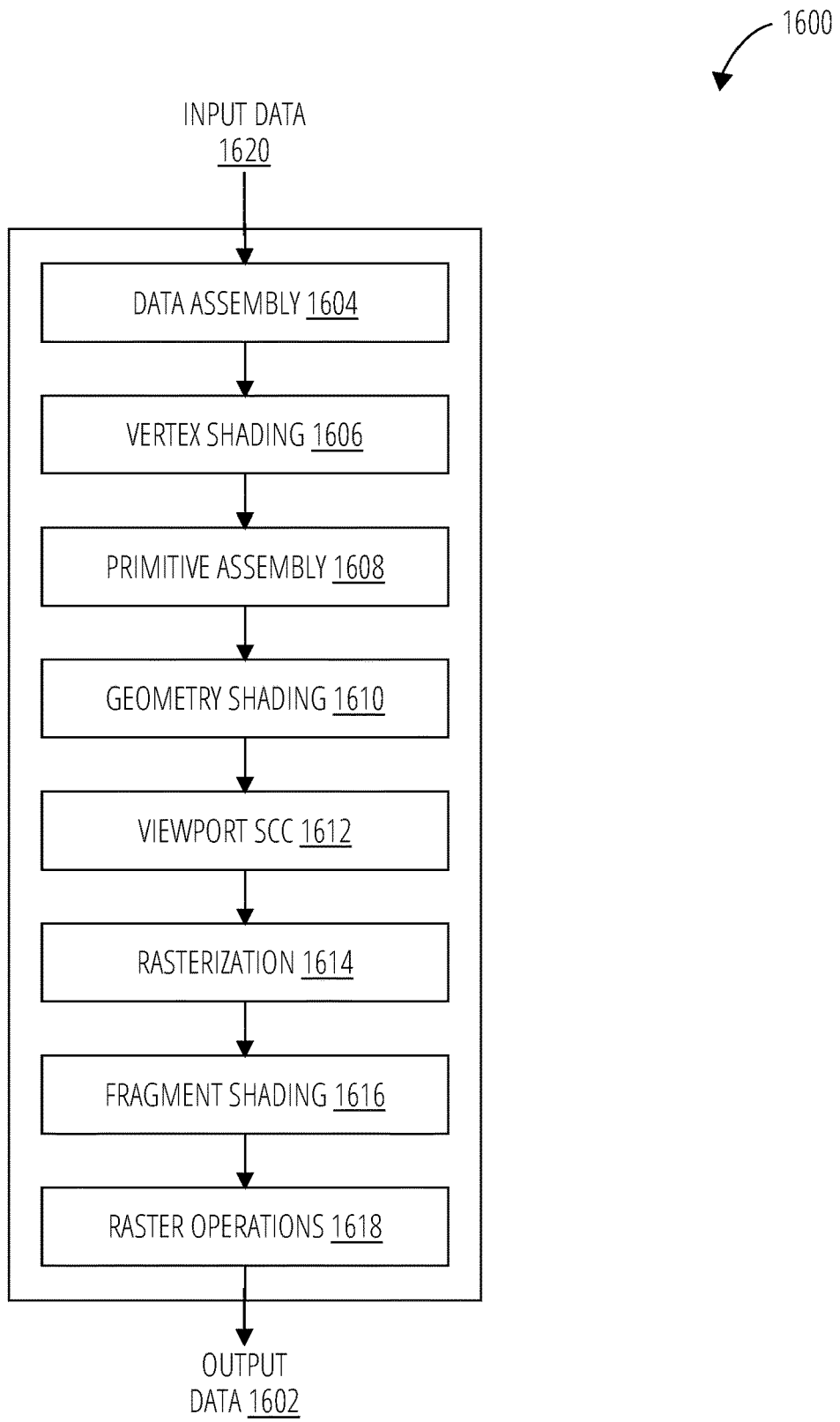
FIG. 16 depicts a graphics processing pipeline 1600 in accordance with one embodiment.

FIG. 16 is a conceptual diagram of a graphics processing pipeline 1600 implemented by the parallel processing unit 1002 of FIG. 10, in accordance with an embodiment. In an embodiment, the parallel processing unit 1002 comprises a graphics processing unit (GPU). The parallel processing unit 1002 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1002 can be configured to process the graphics primitives to generate a frame buffer (e.g., pixel data for each of the pixels of the display).

An application writes model data for a scene (e.g., a collection of vertices and attributes) to a memory such as a system memory or memory 1020. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1300 modules of the parallel processing unit 1002 including one or more of a vertex shader, hull shader, domain shader, geometry shader, and a pixel shader. For example, one or more of the streaming multiprocessor 1300 modules may be configured to execute a vertex shader program that processes a number of vertices defined by the model data. In an embodiment, the different streaming multiprocessor 1300 modules may be configured to execute different shader programs concurrently. For example, a first subset of streaming multiprocessor 1300 modules may be configured to execute a vertex shader program while a second subset of streaming multiprocessor 1300 modules may be configured to execute a pixel shader program. The first subset of streaming multiprocessor 1300 modules processes vertex data to produce processed vertex data and writes the processed vertex data to the level two cache 1204 and/or the memory 1020. After the processed vertex data is rasterized (e.g., transformed from three-dimensional data into two-dimensional data in screen space) to produce fragment data, the second subset of streaming multiprocessor 1300 modules executes a pixel shader to produce processed fragment data, which is then blended with other processed fragment data and written to the frame buffer in memory 1020. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1600 receives input data 601 that is transmitted from one stage to the next stage of the graphics processing pipeline 1600 to generate output data 1602. In an embodiment, the graphics processing pipeline 1600 may represent a graphics processing pipeline defined by the OpenGL® API. As an option, the graphics processing pipeline 1600 may be implemented in the context of the functionality and architecture of the previous Figures and/or any subsequent Figure(s).

As shown in FIG. 16, the graphics processing pipeline 1600 comprises a pipeline architecture that includes a number of stages. The stages include, but are not limited to, a data assembly 1604 stage, a vertex shading 1606 stage, a primitive assembly 1608 stage, a geometry shading 1610 stage, a viewport SCC 1612 stage, a rasterization 1614 stage, a fragment shading 1616 stage, and a raster operations 1618 stage. In an embodiment, the input data 1620 comprises commands that configure the processing units to implement the stages of the graphics processing pipeline 1600 and geometric primitives (e.g., points, lines, triangles, quads, triangle strips or fans, etc.) to be processed by the stages. The output data 1602 may comprise pixel data (e.g., color data) that is copied into a frame buffer or other type of surface data structure in a memory.

The data assembly 1604 stage receives the input data 1620 that specifies vertex data for high-order surfaces, primitives, or the like. The data assembly 1604 stage collects the vertex data in a temporary storage or queue, such as by receiving a command from the host processor that includes a pointer to a buffer in memory and reading the vertex data from the buffer. The vertex data is then transmitted to the vertex shading 1606 stage for processing.

The vertex shading 1606 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1606 stage may manipulate individual vertex attributes such as position, color, texture coordinates, and the like. In other words, the vertex shading 1606 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the obj ect-coordinate space into a world space or a normalized-device-coordinate (NCD) space. The vertex shading 1606 stage generates transformed vertex data that is transmitted to the primitive assembly 1608 stage.

The primitive assembly 1608 stage collects vertices output by the vertex shading 1606 stage and groups the vertices into geometric primitives for processing by the geometry shading 1610 stage. For example, the primitive assembly 1608 stage may be configured to group every three consecutive vertices as a geometric primitive (e.g., a triangle) for transmission to the geometry shading 1610 stage. In some embodiments, specific vertices may be reused for consecutive geometric primitives (e.g., two consecutive triangles in a triangle strip may share two vertices). The primitive assembly 1608 stage transmits geometric primitives (e.g., a collection of associated vertices) to the geometry shading 1610 stage.

The geometry shading 1610 stage processes geometric primitives by performing a set of operations (e.g., a geometry shader or program) on the geometric primitives. Tessellation operations may generate one or more geometric primitives from each geometric primitive. In other words, the geometry shading 1610 stage may subdivide each geometric primitive into a finer mesh of two or more geometric primitives for processing by the rest of the graphics processing pipeline 1600. The geometry shading 1610 stage transmits geometric primitives to the viewport SCC 1612 stage.

In an embodiment, the graphics processing pipeline 1600 may operate within a streaming multiprocessor and the vertex shading 1606 stage, the primitive assembly 1608 stage, the geometry shading 1610 stage, the fragment shading 1616 stage, and/or hardware/software associated therewith, may sequentially perform processing operations. Once the sequential processing operations are complete, in an embodiment, the viewport SCC 1612 stage may utilize the data. In an embodiment, primitive data processed by one or more of the stages in the graphics processing pipeline 1600 may be written to a cache (e.g. L1 cache, a vertex cache, etc.). In this case, in an embodiment, the viewport SCC 1612 stage may access the data in the cache. In an embodiment, the viewport SCC 1612 stage and the rasterization 1614 stage are implemented as fixed function circuitry.

The viewport SCC 1612 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1614 stage.

The rasterization 1614 stage converts the 3D geometric primitives into 2D fragments (e.g. capable of being utilized for display, etc.). The rasterization 1614 stage may be configured to utilize the vertices of the geometric primitives to setup a set of plane equations from which various attributes can be interpolated. The rasterization 1614 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1614 stage generates fragment data (e.g., interpolated vertex attributes associated with a particular sample location for each covered pixel) that are transmitted to the fragment shading 1616 stage.

The fragment shading 1616 stage processes fragment data by performing a set of operations (e.g., a fragment shader or a program) on each of the fragments. The fragment shading 1616 stage may generate pixel data (e.g., color values) for the fragment such as by performing lighting operations or sampling texture maps using interpolated texture coordinates for the fragment. The fragment shading 1616 stage generates pixel data that is transmitted to the raster operations 1618 stage.

The raster operations 1618 stage may perform various operations on the pixel data such as performing alpha tests, stencil tests, and blending the pixel data with other pixel data corresponding to other fragments associated with the pixel. When the raster operations 1618 stage has finished processing the pixel data (e.g., the output data 1602), the pixel data may be written to a render target such as a frame buffer, a color buffer, or the like.

It will be appreciated that one or more additional stages may be included in the graphics processing pipelinev1600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1610 stage). Other types of graphics processing pipelines are contemplated as being within the scope of the present disclosure. Furthermore, any of the stages of the graphics processing pipeline 1600 may be implemented by one or more dedicated hardware units within a graphics processor such as parallel processing unit 1002. Other stages of the graphics processing pipeline 1600 may be implemented by programmable hardware units such as the streaming multiprocessor 1300 of the parallel processing unit 1002.

The graphics processing pipeline 1600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1002. The API provides an abstraction for a programmer that lets a programmer utilize specialized graphics hardware, such as the parallel processing unit 1002, to generate the graphical data without requiring the programmer to utilize the specific instruction set for the parallel processing unit 1002. The application may include an API call that is routed to the device driver for the parallel processing unit 1002. The device driver interprets the API call and performs various operations to respond to the API call. In some instances, the device driver may perform operations by executing instructions on the CPU. In other instances, the device driver may perform operations, at least in part, by launching operations on the parallel processing unit 1002 utilizing an input/output interface between the CPU and the parallel processing unit 1002. In an embodiment, the device driver is configured to implement the graphics processing pipeline 1600 utilizing the hardware of the parallel processing unit 1002.

Various programs may be executed within the parallel processing unit 1002 in order to implement the various stages of the graphics processing pipeline 1600. For example, the device driver may launch a kernel on the parallel processing unit 1002 to perform the vertex shading 1606 stage on one streaming multiprocessor 1300 (or multiple streaming multiprocessor 1300 modules). The device driver (or the initial kernel executed by the parallel processing unit 1002) may also launch other kernels on the parallel processing unit 1002 to perform other stages of the graphics processing pipeline 1600, such as the geometry shading 1610 stage and the fragment shading 1616 stage. In addition, some of the stages of the graphics processing pipeline 1600 may be implemented on fixed unit hardware such as a rasterizer or a data assembler implemented within the parallel processing unit 1002. It will be appreciated that results from one kernel may be processed by one or more intervening fixed function hardware units before being processed by a subsequent kernel on a streaming multiprocessor 1300.

LISTING OF DRAWING ELEMENTS

| | |
|---|---|
| 100 | differential PAM-2 transceiver |
| 102 | driver circuit |
| 104 | differential data line |
| 106 | receiver decoding logic |
| 200 | PAM-2 transceiver |
| 202 | data line |
| 204 | pass-gate circuit |
| 206 | last-stage driver circuit |
| 208 | feedback driver circuit |
| 210 | driver circuit |
| 212 | control logic |
| 300 | PAM-4 transceiver |
| 302 | driver circuit |
| 304 | tunable pass-gate circuit |
| 306 | LSB stage |
| 308 | MSB stage |
| 310 | data line node |
| 312 | slicer circuits |
| 314 | PAM decoder logic |
| 400 | transmitter frontend circuit |
| 402 | pass-gate circuit |
| 404 | last-stage driver circuit |
| 406 | driver circuit |
| 408 | driver circuit |
| 500 | receiver frontend circuit |
| 502 | driver circuit |
| 504 | driver circuit |
| 506 | driver circuit |
| 508 | driver circuit |
| 510 | pass-gate circuit |
| 600 | feed-back stage |
| 602 | pass-gate circuit |
| 604 | driver circuit |
| 606 | driver circuit |
| 608 | driver circuit |
| 700 | feed-forward stage |
| 702 | driver circuit |
| 802 | transceiver |
| 804 | computing system |
| 806 | vehicle |
| 808 | robot |
| 900 | data center |
| 902 | data center infrastructure layer |
| 904 | framework layer |
| 906 | software layer |
| 908 | application layer |
| 910 | resource orchestrator |
| 912 | grouped computing resources |
| 914a | node C.R. |
| 914b | node C.R. |
| 914c | node C.R. |
| 916 | job scheduler |
| 918 | configuration manager |
| 920 | resource manager |
| 922 | distributed file system |
| 924 | software |
| 926 | application(s) |
| 1002 | parallel processing unit |
| 1004 | I/O unit |
| 1006 | front-end unit |
| 1008 | scheduler unit |
| 1010 | work distribution unit |
| 1012 | hub |
| 1014 | crossbar |
| 1016 | NVLink |
| 1018 | interconnect |
| 1020 | memory |
| 1100 | general processing cluster |

-continued

LISTING OF DRAWING ELEMENTS

| | |
|---|---|
| 1102 | pipeline manager |
| 1104 | pre-raster operations unit |
| 1106 | raster engine |
| 1108 | work distribution crossbar |
| 1110 | memory management unit |
| 1112 | data processing cluster |
| 1114 | primitive engine |
| 1116 | M-pipe controller |
| 1200 | memory partition unit |
| 1202 | raster operations unit |
| 1204 | level two cache |
| 1206 | memory interface |
| 1300 | streaming multiprocessor |
| 1302 | instruction cache |
| 1304 | scheduler unit |
| 1306 | register file |
| 1308 | core |
| 1310 | special function unit |
| 1312 | load/store unit |
| 1314 | interconnect network |
| 1316 | shared memory/L1 cache |
| 1318 | dispatch |
| 1400 | processing system |
| 1402 | central processing unit |
| 1404 | switch |
| 1406 | parallel processing module |
| 1500 | exemplary processing system |
| 1502 | communications bus |
| 1504 | main memory |
| 1506 | input devices |
| 1508 | display devices |
| 1510 | network interface |
| 1600 | graphics processing pipeline |
| 1602 | output data |
| 1604 | data assembly |
| 1606 | vertex shading |
| 1608 | primitive assembly |
| 1610 | geometry shading |
| 1612 | viewport SCC |
| 1614 | rasterization |
| 1616 | fragment shading |
| 1618 | raster operations |
| 1620 | input data |

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A four-level pulse amplitude modulated (PAM-4) transceiver circuit comprising:
    a receiver front end comprising a ring oscillator;
    a transmitter front end comprising a pass-gate circuit in a first feedback path across a last-stage driver circuit;
    two stages arranged in parallel to form a PAM-4 symbol for a most significant bit of a data value; and
    one stage to form a least significant bit of the PAM-4 symbol.

2. The transceiver circuit of claim 1, wherein the pass-gate, the last-stage driver circuit, and the ring oscillator are each comprised of complementary metal-oxide-semiconductor (CMOS) components.

3. The transceiver circuit of claim 1, wherein an output current of the pass-gate circuit is tunable.

4. The transceiver circuit of claim 1, wherein a resistance of a feedback driver circuit of the ring oscillator is tunable.

5. The transceiver circuit of claim 1, wherein the transceiver circuit is a two-level pulse amplitude modulated (PAM-2) transceiver.

6. The transceiver circuit of claim 1, wherein each of the stages comprises a pass-gate circuit and a last-stage driver circuit arranged in parallel.

7. The transceiver circuit of claim 1, wherein the transmitter front end further comprises a feed-forward circuit in parallel with the first feedback path.

8. The transceiver circuit of claim 1, wherein the ring oscillator further comprises a feed-forward circuit.

9. The transceiver circuit of claim 1, wherein the transmitter further comprises at least one driver circuit in a second feedback path across the last-stage driver circuit.

10. The transceiver circuit of claim 9, wherein the first feedback path is across only the last-stage driver circuit, and the second feedback path is across a plurality of other driver circuits.

11. The circuit of claim 1, wherein the ring oscillator comprises a pass-gate circuit in a second feedback path across a first-stage driver circuit and a second feedback path across one or more later-stage driver circuits.

12. A system comprising:
a plurality of data lines;
an N-level pulse amplitude modulated (PAM-N) transceiver circuit coupled to one or more of the data lines, the transceiver circuit comprising:
a receiver front end comprising a ring oscillator;
a transmitter front end comprising N-1 stages each of the stages arranged to contribute to a PAM-N voltage level on the data line, each of the stages comprising a pass-gate circuit in a first feedback path across a last-stage driver circuit; and
wherein the ring oscillator comprises a pass-gate circuit in a second feedback path across a first-stage driver circuit and a second feedback path across one or more later-stage driver circuits.

13. The system of claim 12, wherein N=2.

14. The system of claim 12, wherein N=4.

15. The system of claim 12, wherein the transmitter front end further comprises a feed-forward circuit in parallel with the first feedback path.

16. The system of claim 12, wherein the ring oscillator further comprises a feed-forward circuit.

17. A transceiver circuit comprising:
a receiver front end comprising a ring oscillator;
a transmitter front end comprising a Complementary Metal Oxide Semiconductor (CMOS) resistive component in a first feedback path across a last-stage driver circuit; and
wherein the transmitter further comprises at least one driver circuit in a second feedback path across the last-stage driver circuit.

18. The transceiver circuit of claim 17, wherein the last-stage driver circuit and the ring oscillator are each comprised of exclusively CMOS components.

19. The transceiver circuit of claim 17, wherein an output current of the CMOS resistive component is tunable.

20. The transceiver circuit of claim 17, wherein a resistance of a feedback driver circuit of the ring oscillator is tunable.

21. The transceiver circuit of claim 17, wherein the transceiver circuit is a two-level pulse amplitude modulated (PAM-2) transceiver.

22. The transceiver circuit of claim 17, wherein the transceiver circuit is a four-level pulse amplitude modulated (PAM-4) transceiver.

23. The transceiver circuit of claim 22, the transmitter front end further comprising:
two stages arranged in parallel to form a PAM-4 symbol for a most significant bit of a data value; and
one stage to form a least significant bit of the PAM-4 symbol.

24. The transceiver circuit of claim 23, wherein each of the stages comprises a CMOS resistive component and a last-stage driver circuit arranged in parallel.

25. The transceiver circuit of claim 17, wherein the transmitter front end further comprises a feed-forward circuit in parallel with the first feedback path.

26. The transceiver circuit of claim 17, wherein the ring oscillator further comprises a feed-forward circuit.

27. The transceiver circuit of claim 17, wherein the first feedback path is across only the last-stage driver circuit, and the second feedback path is across a plurality of other driver circuits.

28. The circuit of claim 17, wherein the ring oscillator comprises a CMOS resistive component in a second feedback path across a first-stage driver circuit and a second feedback path across one or more later-stage driver circuits.

* * * * *